United States Patent
Silver et al.

(10) Patent No.: US 10,099,950 B2
(45) Date of Patent: Oct. 16, 2018

(54) BIO-ELECTROCHEMICAL SYSTEM FOR TREATING WASTEWATER

(75) Inventors: Matthew Silver, Cambridge, MA (US); Justin Buck, Cambridge, MA (US); Patrick Kiely, Brighton, MA (US); Juan J. Guzman, Medford, MA (US)

(73) Assignee: CAMBRIAN INNOVATION LLC, Watertown, MA (US)

( * ) Notice: Subject to any disclaimer, the term of this patent is extended or adjusted under 35 U.S.C. 154(b) by 886 days.

(21) Appl. No.: 13/811,132

(22) PCT Filed: Apr. 14, 2011

(86) PCT No.: PCT/US2011/032500
§ 371 (c)(1),
(2), (4) Date: Jul. 30, 2013

(87) PCT Pub. No.: WO2012/011984
PCT Pub. Date: Jan. 26, 2012

(65) Prior Publication Data
US 2013/0299400 A1    Nov. 14, 2013

Related U.S. Application Data

(60) Provisional application No. 61/394,576, filed on Oct. 19, 2010, provisional application No. 61/366,271, filed on Jul. 21, 2010.

(51) Int. Cl.
*F02M 37/22* (2006.01)
*C12N 1/00* (2006.01)
(Continued)

(52) U.S. Cl.
CPC .......... *C02F 3/005* (2013.01); *C02F 1/46109* (2013.01); *C02F 1/283* (2013.01);
(Continued)

(58) Field of Classification Search
CPC .......... A61M 1/00; A61M 5/00; B01D 27/08; B01D 29/21; B01D 33/70; B01D 33/80;
(Continued)

(56) References Cited

U.S. PATENT DOCUMENTS 4,090,940 A    5/1978  Switzgable
4,388,162 A    6/1983  Sammells et al.
(Continued)

FOREIGN PATENT DOCUMENTS

CA    2247135         8/2006
CN    101849180 A     9/2010
(Continued)

OTHER PUBLICATIONS

Wang, et al., "Accelerated Start-up of Two-chambered Microbial Fuel Cells: Effect of Anodic Positive Poised Potential," Electrochimica Acta, vol. 54, Issue 3, pp. 1109-1114 (Jan. 1, 2009).
(Continued)

*Primary Examiner* — Hayden Brewster
(74) *Attorney, Agent, or Firm* — Capitol Patent & Trademark Law Firm, PLLC

(57) ABSTRACT

The invention relates to bio-electrochemical systems for treating wastewater, and sour gas produced by anaerobic digestion of organic material. The invention further relates to novel anode/cathode pairing schemes, and electric and hydraulic architectures for use in bio-electrochemical systems.

17 Claims, 12 Drawing Sheets

(51) Int. Cl.

| | | |
|---|---|---|
| *C25D 17/00* | (2006.01) | |
| *C02F 3/00* | (2006.01) | |
| *C02F 1/461* | (2006.01) | |
| A61M 1/00 | (2006.01) | |
| A61M 5/00 | (2006.01) | |
| B01D 35/00 | (2006.01) | |
| C25B 15/00 | (2006.01) | |
| C25C 7/00 | (2006.01) | |
| C02F 1/28 | (2006.01) | |
| C02F 3/12 | (2006.01) | |
| C02F 3/28 | (2006.01) | |
| C02F 3/34 | (2006.01) | |
| C02F 101/00 | (2006.01) | |
| C02F 103/00 | (2006.01) | |

(52) U.S. Cl.
CPC ......... *C02F 1/46114* (2013.01); *C02F 3/1273* (2013.01); *C02F 3/2826* (2013.01); *C02F 3/345* (2013.01); *C02F 2001/46133* (2013.01); *C02F 2001/46157* (2013.01); *C02F 2101/006* (2013.01); *C02F 2103/002* (2013.01); *C02F 2103/005* (2013.01); *C02F 2201/4611* (2013.01); *C02F 2201/46115* (2013.01); *C02F 2201/46135* (2013.01); *C02F 2301/08* (2013.01); *C02F 2303/10* (2013.01); *Y02E 50/343* (2013.01); *Y02W 10/15* (2015.05); *Y02W 10/30* (2015.05); *Y02W 10/37* (2015.05)

(58) Field of Classification Search
CPC .... B01D 35/00; B01D 35/06; B01D 2201/50; C25B 1/02; C25B 1/04; C25B 9/00; C25B 9/02; C25B 9/045; C25B 9/08; C25B 9/18; C25B 9/20; C25B 9/206; C25B 15/00; C25C 7/00; C25C 7/02; C25D 17/00; C02F 1/283; C02F 1/46109; C02F 1/46114; C02F 3/005; C02F 3/345; C02F 3/1273; C02F 3/28; C02F 3/2826; C02F 3/082; C02F 3/04; C02F 3/06; C02F 3/10; C02F 3/101; C02F 2001/46133; C02F 2001/46157; C02F 2101/006; C02F 2103/002; C02F 2103/005; C02F 2201/4611; C02F 2201/46115; C02F 2201/46135
USPC ................ 204/253, 267, 242, 252; 205/637; 210/143, 150, 243
See application file for complete search history.

(56) References Cited

U.S. PATENT DOCUMENTS

| | | | | |
|---|---|---|---|---|
| 5,518,836 | A * | 5/1996 | McCullough | D01F 9/22 423/447.2 |
| 8,440,438 | B2 | 5/2013 | Cheng et al. | |
| 2002/0134674 | A1* | 9/2002 | Andrews | A61L 2/183 204/242 |
| 2002/0148722 | A1 | 10/2002 | Hermann et al. | |
| 2003/0226766 | A1 | 12/2003 | Orlebeke | |
| 2003/2267660 | | 12/2003 | o | |
| 2004/0045885 | A1 | 3/2004 | Naoki et al. | |
| 2004/0081875 | A1* | 4/2004 | Milliken | C25B 1/02 429/469 |
| 2004/0121208 | A1* | 6/2004 | James | H01M 8/1011 429/483 |
| 2005/0164331 | A1 | 7/2005 | Kim et al. | |
| 2005/0183964 | A1 | 8/2005 | Roberts et al. | |
| 2005/0255345 | A1 | 11/2005 | Gerritse et al. | |
| 2006/0011491 | A1 | 1/2006 | Logan | |
| 2007/0017877 | A1 | 1/2007 | Andes | |
| 2007/0048577 | A1 | 3/2007 | Ringeisen et al. | |
| 2007/0259217 | A1 | 11/2007 | Logan | |
| 2008/0277273 | A1 | 11/2008 | Logan | |
| 2008/0283391 | A1* | 11/2008 | Ogawa | C02F 1/288 204/242 |
| 2008/0292912 | A1 | 11/2008 | Logan et al. | |
| 2009/0026088 | A1* | 1/2009 | Sumida | C02F 1/461 205/742 |
| 2009/0130734 | A1 | 5/2009 | Mets | |
| 2009/0142627 | A1 | 6/2009 | Shimomura et al. | |
| 2009/0166208 | A1 | 7/2009 | Dong | |
| 2009/0274353 | A1 | 12/2009 | Massie | |
| 2009/0317882 | A1* | 12/2009 | Cheng | C12M 21/04 435/167 |
| 2010/0051542 | A1 | 3/2010 | Elektorowicz et al. | |
| 2010/0270158 | A1 | 10/2010 | Logan | |
| 2011/0165667 | A1 | 7/2011 | Mets | |
| 2011/0183159 | A1 | 7/2011 | He et al. | |
| 2012/0132521 | A1* | 5/2012 | Silver | C02F 3/005 204/252 |
| 2012/0223000 | A1* | 9/2012 | Shiue | C02F 1/4672 210/192 |

FOREIGN PATENT DOCUMENTS

| | | |
|---|---|---|
| EP | 573226 A1 | 12/1993 |
| EP | 1364914 A1 | 11/2003 |
| JP | 08138978 A | 5/1996 |
| JP | H09-155388 | 6/1997 |
| JP | H10-230293 A | 9/1998 |
| JP | 11-010184 H | 1/1999 |
| JP | H11047793 | 2/1999 |
| JP | H11-216496 A | 8/1999 |
| JP | H11-253993 A | 9/1999 |
| JP | 2000-051894 A | 2/2000 |
| JP | 2000-157995 A | 6/2000 |
| JP | 2001-145896 A | 5/2001 |
| JP | 2002-086189 A | 3/2002 |
| JP | 2002520032 A | 7/2002 |
| JP | 2003071453 | 3/2003 |
| JP | 2004342412 | 12/2004 |
| JP | 2005-125172 A | 5/2005 |
| JP | 2005256155 | 9/2005 |
| JP | 2006-35158 | 2/2006 |
| JP | 2006159112 | 6/2006 |
| JP | 2007090232 | 4/2007 |
| JP | 2007-117995 A | 5/2007 |
| JP | 2007-227216 A | 9/2007 |
| JP | 2008-114191 A | 5/2008 |
| JP | 2010537822 | 12/2010 |
| KR | 100810718 B1 | 3/2008 |
| WO | WO-0003447 A1 | 1/2000 |
| WO | WO-2001004061 A1 | 1/2001 |
| WO | WO-2004004036 A2 | 1/2004 |
| WO | WO-2008059331 A2 | 5/2008 |
| WO | WO-2008109911 A1 | 9/2008 |
| WO | WO-2008109962 A1 | 9/2008 |
| WO | WO-2009042631 A2 | 4/2009 |
| WO | WO-2009072887 A1 | 6/2009 |
| WO | WO-2009046417 A1 | 9/2009 |
| WO | WO-2009131452 A1 | 10/2009 |
| WO | WO-2009140428 A1 | 11/2009 |
| WO | WO-2009155587 A2 | 12/2009 |
| WO | WO-2010044983 A2 | 4/2010 |
| WO | WO-2010147683 A1 | 12/2010 |
| WO | WO-2011000084 A1 | 1/2011 |
| WO | WO-2011003081 A1 | 1/2011 |
| WO | WO-2012011984 A1 | 1/2012 |

OTHER PUBLICATIONS

Arnold, et al., "Regulation of Dissimilatory Fe(III) Reduction Activity in Shewanella putrefaciens," App and Env Microbiol, vol. 56, No. 9, pp. 2811-2817 (Sep. 1990).

Beliaev, et al., "Global transcriptome analysis of Shewanella oneidensis MR-1 exposed to different terminal electron acceptors," J Bacteriol, vol. 187, No. 20, pp. 7138-7145 (Oct. 2005).

(56) References Cited

OTHER PUBLICATIONS

Bendikov, et al., "Development and Environmental Application of a Nitrate Selective Microsensor Based on Doped Polypyrrole Films," Sensors and Actuators B, vol. 106, No. 2 (May 13, 2005), 7 pages.
Bergel, et al., "Catalysis of Oxygen Reduction in PEM Fuel Cell by Seawater Biofilm." Electrochem. Commun., vol. 7(9), pp. 900-904 (2005).
Biffinger, et al., "A Biofilm Enhanced Miniature Microbial Fuel Cell Using Shewanella Oneidensis DSP10 and Oxygen Reduction Cathodes," Biosensors and Bioelectronics, vol. 22, pp. 1672-1679 (2007).
Bourgeois, et al., "On-Line Monitoring of Wastewater Quality: A Review," Journal of Chemical Technology & Biotechnology, vol. 76, pp. 337-348 (2001).
Bretschger, et al., "Current Production and Metal Oxide Reduction by Shewanella oneidensis MR-1 Wild Type and Mutants," App and Env. Microbiol., vol. 73, No. 21, pp. 7003-7012 (2007), including "Erratum," App and Env. Microbiol., vol. 74, No. 2, pp. 553 (2008); 11 pages.
Call, D. and Logan, B. E., "Hydrogen production in a single chamber microbial electrolysis cell lacking a membrane," Environ. Sci. Technol., vol. 42, pp. 3401-3406 (2008).
Chang, I. et al., "Improvement of a microbial fuel cell performance as a BOD sensor using respiratory inhibitors," Biosensors and Bioelectronics, vol. 20, pp. 1856-1859 (2005).
Chang, I. et al , "Continuous determination of biochemical oxygen demand using microbial fuel cell type biosensor," Biosensors and Bioelectronics, vol. 19, pp. 607-613 (2004).
Cheng, et al., "Direct Biological Conversion of Electrical Current into Methane by Electromethanogenesis," Environmental Science and Technology, American Chemical Society, vol. 43, No. 10, pp. 3953-3958 (Mar. 26, 2009).
Cheng, et al., "Increased Performance of Single-Chamber Microbial Fuel Cells Using an Improved Cathode Structure," Electrochemistry Communications, vol. 8, No. 3, pp. 489-494 (Mar. 2006).
Cheng, S. and Logan, B. E., "Sustainable and Efficient Biohydrogen Production via Electrohydrogenesis," PNAS, vol. 104, No. 47, pp. 18871-18873 (2007).
Clauwaert, et al., "Open Air Biocathode Enables Effective Electricity Generation with Microbial Fuel Cells," Environmental Science & Technology, vol. 41, No. 21, pp. 7564-7569 (Nov. 2007).
Cruz-Garcia, et al., "Respiratory nitrate ammonification by Shewanella oneidensis MR-1," J Bacteriol, vol. 189, No. 2, pp. 656-662 (Jan. 2007).
David, et al., "Nitrogen balance in and export from an agricultural watershed," J Environ Qual., vol. 26, pp. 1038-1048 (1997).
Dichristina, T.J., "Effects of Nitrate and Nitrite on Dissimilatory Iron Reduction by Shewanella putrefaciens 200," J Bacteriol, vol. 174, No. 6, pp. 1891-1896 (1992).
Dinnes, et al., "Nitrogen Management Strategies to Reduce Nitrate Leaching in Tile-Drained Midwestern Soils," Agronomy Journal, vol. 94, pp. 153-171 (2002).
Extended European Search Report issued by the European Patent Office for European Application No. 10789884.3 dated May 16, 2013 (10 pgs.).
Faeth, P., "Fertile Ground: Nutrient Trading's Potential to Cost-Effectively Improve Water Quality," Washington, DC: World Resources Institute, 59 pgs. (2000).
Freguia, et al., "Electron and Carbon Balances in Microbial Fuel Cells Reveal Temporary Bacterial Storage Behavior During Electricity Generation," Environmental Science & Technology, vol. 41, No. 8, pp. 2915-2921 (Apr. 2007).
Gieling, et al., "ISE and Chemfet sensors in greenhouse cultivation," Sensors and Actuators B, vol. 105, pp. 74-80 (2005).
Gorby, et al., "Electrically conductive bacterial nanowires produced by Shewanella oneidensis strain MR-1 and other microorganisms." Proceedings of the National Academy of Sciences, vol. 103, No. 30, pp. 11358-11363 (2006).
Grommen, et al., "Removal of Nitrate in Aquaria by Means of Electrochemically Generated Hydrogen Gas as Electron Donor for Biological Denitrification," Aquacultural Engineering, vol. 34, No. 1, pp. 33-39 (2006).
Hallenbeck, P.C. and Benemann, J.R., "Biological hydrogen production; fundamentals and limiting processes." Int. J. Hydrogen Energy, vol. 27, pp. 1185-1193 (2002).
He, et al., "Electricity Generation from Artificial Wastewater Using an Upflow Microbial Fuel Cell," Environmental Science & Technology, vol. 39, No. 14, pp. 5262-5267 (Jul. 2005).
He, Zhen, and Angenent, L.T., "Application of Bacterial Biocathodes in Microbial Fuel Cells," Electroanalysis, vol. 18, No. 19-20, pp. 2009-2015 (Oct. 2006).
Holmes, et al., "Potential Role of a Novel Psychrotolerant Member of the Family Geobacteraceae, *Geopsychrobacter electrodiphilus* gen. nov., sp. nov., in Electricity Production by a Marine Sediment Fuel Cell," Applied and Environmental Microbiology, vol. 70, No. 10, pp. 6023-6030 (2004).
International Search Report and Written Opinion issued by the Korean Intellectual Property Office as International Searching Authority for for International Application No. PCT/US2010/059554 dated Sep. 26, 2011 (8 pgs.).
International Search Report and Written Opinion issued by the Korean Intellectual Property Office as International Searching Authority for International Application No. PCT/US2011/056920 dated May 31, 2012 (10 pgs.).
International Search Report and Written Opinion issued by the Korean Intellectual Property Office as International Searching Authority for International Application No. PCT/US2010/025224 dated Oct. 12, 2010 (9 pgs.).
International Search Report and Written Opinion issued by the Korean Intellectual Property Office as International Searching Authority for International Application No. PCT/US2011/032500 dated Dec. 27, 2011 (11 pgs.).
International Search Report and Written Opinion issued by the Korean Intellectual Property Office as International Searching Authority for International Application No. PCT/US2011/044872 dated Mar. 15, 2012 (12 pgs.).
Jia, et al., "Simultaneous Organics Removal and Bio-Electrochemical Denitrification in Microbial Fuel Cells," Bioprocess and Biosystems Engineering, vol. 31, No. 4, pp. 315-321 (2008).
Kang, et al., "A microbial fuel cell with improved cathode reaction as a low biochemical oxygen demand sensor," Biotechnology Letters, vol. 25, pp. 1357-1361 (2003).
Kim, et al., "Novel BOD (biological oxygen demand) sensor using mediator-less microbial fuel cell," Biotechnology Letters, vol. 25, pp. 541-545 (2003).
Kim, et al., "Membrane-electrode assembly enhances performance of a microbial fuel cell type biological oxygen demand sensor," Environmental Technology, vol. 30, No. 4, pp. 329-336 (Apr. 1, 2009).
Kim, H., et al., "A Microbial Fuel Cell Type Lactate Biosensor Using a Metal-Reducing Bacterium, Shewanella putrefaciens," J. Microbiol. Biotechnol., vol. 9, No. 3, pp. 365-367 (1999).
Kostka, J.E. and Nealson, K.H., "Dissolution and reduction of magnetite by bacteria," Environmental Science and Technology, vol. 29, pp. 2535-2540 (1995).
Kreysa, et al., "Bioelectrochemical Hydrogen Production," International Journal of Hydrogen Energy, vol. 19, No. 18, pp. 673-676 (Aug. 1, 1994).
Kumlanghan, et al., "Microbial fuel cell-based biosensor for fast analysis of biodegradable organic matter," Biosensors and Bioelectronics, vol. 22, pp. 2939-2944 (2007).
Kuroda, et al., "$CO_2$ Reduction to Methane and Acetate Using a Bio-Electro Reactor with Immobilized Methanogens and Homoacetogens on Electrodes," Energy Conyers. Mgmt, vol. 36, No. 6-9, pp. 787-790 (1995).
Lee, et al., "Fate of $H_2$ in an Upflow Single-Chamber Microbial Electrolysis Cell Using a Metal-Catalyst-Free Cathode," Environmental Science & Technology, vol. 43, No. 20, pp. 7971-7976 (Oct. 15, 2009).

(56) References Cited

OTHER PUBLICATIONS

Liu, et al., "Immobilised Activated Sludge Based Biosensor for Biochemical Oxygen Demand Measurement," Biosensors and Bioelectronics, vol. 14, No. 12, pp. 883-893 (2000).
Liu, et al., "Power Generation in Fed-Batch Microbial Fuel Cells as a Function of Ionic Strength, Temperature, and Reactor Configuration," Environ. Sci. Technol., vol. 39, No. 14, pp. 5488-5493 (2005).
Liu, et al., "Production of Electricity during Wastewater Treatment Using a Single Chamber Microbial Fuel Cell." Environmental Science & Technology, vol. 38, No. 7, pp. 2281-2285 (2004).
Liu, J. and Mattiasson, B., "Microbial BOD Sensors for Wastewater Analysis," Water Research, vol. 36, No. 15, pp. 3786-3802 (2002).
Logan, Bruce E, and Regan, John M., "Microbial Fuel Cells: Challenges and Applications." Environmental Science & Technology, vol. 40, No. 17, pp. 5172-5180 (Sep. 1, 2006).
Logan, et al., "Electricity generation from cysteine in a microbial fuel cell," Water Res., vol. 39, pp. 942-952 (2005).
Logan, et al., "Graphite Fiber Brush Anodes for Increased Power Production in Air-Cathode Microbial Fuel Cells," Environmental Science & Technology, vol. 41, No. 9, pp. 3341-3346 (May 2007).
Logan, et al., "Microbial Electrolysis Cells for High Yield Hydrogen Gas Production from Organic Matter," Environmental Science & Technology, vol. 42, No. 23, pp. 8630-8640 (Dec. 2008).
Logan, et al., "Microbial Fuel Cells: Methodology and Technology," Environmental Science & Technology, vol. 40, No. 17, pp. 5181-5192 (2006).
Min, et al., "Electricity Generation from Swine Wastewater Using Microbial Fuel Cells," Water Research, vol. 39, No. 20, pp. 4961-4968 (Dec. 2005).
Niessen, et al., "Gaining Electricity from in Situ Oxidation of Hydrogen Produced by Fermentative Cellulose Degradation," Letters in Applied Microbiology, vol. 41, No. 3, pp. 286-290 (Sep. 2005).
Office Action issued by the Japan Patent Office for Japan Patent Application No. 2014-184927 dated Sep. 15, 2015 (8 total pages).
Oh, S., and Logan, B. E., "Hydrogen and Electricity Production from a Food Processing Wastewater Using Fermentation and Microbial Fuel Cell Technologies," Water Research, vol. 39, pp. 4673-4682 (2005).
Pham, et al., "Microbial Fuel Cells in Relation to Conventional Anaerobic Digestion Technology," Engineering in Life Sciences, vol. 6, No. 3, pp. 285-292 (2006).
Rabaey, et al., "Biofuel Cells Select for Microbial Consortia That Self-Mediate Electron Transfer," Applied and Environmental Microbiology, vol. 70, No. 9, pp. 5373-5382 (Sep. 2004).
Rabaey, et al., "Tubular Microbial Fuel Cells for Efficient Electricity Generation," Environmental Science and Technology, vol. 39, No. 20, pp. 8077-8082 (2005).
Rabaey, et al., "Cathodic Oxygen Reduction Catalyzed by Bacteria in Microbial Fuel Cells," The ISME Journal, vol. 2, No. 5, pp. 1-9 (Feb. 2008).
Rabaey, K. and Verstraete, W., "Microbial Fuel Cells: Novel Biotechnology for Energy Generation," Trends in Biotechnology, vol. 23, No. 6, pp. 291-298 (2005).
Ratako, et al., "Micro- and Mini-Nitrate Sensors for Monitoring of Soils, Groundwater and Aquatic Systems," Center for Embedded Network Sensing, 3 pgs. (May 12, 2009).
Rezaei, et al., "Substrate-enhanced microbial fuel cells for improved remote power generation from sediment-based systems," Environ Sci. Technol., vol. 41, pp. 4053-4058 (2007).
Ringeisen, et al., "High Power Density from a Miniature Microbial Fuel Cell Using Shewanella oneidensis DSP10," Environ. Sci. Technol., vol. 40, pp. 2629-2634 (2006).
Rozendal, et al., "Principle and Perspectives of Hydrogen Production through Biocatalyzed Electrolysis," International Journal of Hydrogen Energy, vol. 31, No. 12, pp. 1632-1640 (Sep. 2006).
Selembo, et al., "The Use of Stainless Steel and Nickel Alloys as Low-Cost Cathodes in Microbial Electrolysis Cells," Journal of Power Sources, vol. 190, No. 2, pp. 271-278 (May 2009).
Shantaram, et al., "Wireless sensors powered by microbial fuel cells," Environ Sci Technol, vol. 39, pp. 5037-5042 (2005).
Sukkasem, et al., "Effect of Nitrate on the Performance of Single Chamber Air Cathode Microbial Fuel Cells," Water Research, vol. 42, No. 19, pp. 4743-4750 (Dec. 2008).
Tabacova, et al., "Exposure to Oxidized Nitrogen: Lipid Peroxidation and Neonatal Health Risk," Archives of Environmental Health: An International Journal, vol. 53, No. 3 (1998), 9 pages.
Tabacova, et al., "Maternal Exposure to Exogenous Nitrogen Compounds and Complications of Pregnancy," Archives of Environmental Health: An International Journal, vol. 52, No. 5, (1997), 8 pages.
Van Ginkel, et al., "Biohydrogen gas production from food processing and domestic wastewaters," Int. J. Hydrogen Energy, vol. 30, pp. 1535-1542 (2005).

* cited by examiner

BIO-ELECTROCHEMICAL SYSTEM FOR TREATING WASTEWATER

REFERENCE TO RELATED APPLICATIONS

This patent application is a U.S. National Stage Application under 35 U.S.C. § 371 of PCT/US2011/032500 filed Apr. 14, 2011 and claims the benefit of U.S. Provisional Application Ser. No. 61/366,271, filed Jul. 21, 2010, and U.S. Provisional Application Ser. No. 61/394,576, filed Oct. 19, 2010. The contents of each of these applications are herein incorporated by reference in their entireties.

STATEMENT OF GOVERNMENT INTEREST

This invention was made with Government support under Contract 1152409 awarded by the National Science Foundation. The U.S. Government has certain rights in this invention.

TECHNICAL FIELD

The invention generally relates to bio-electrochemical systems for treating water, wastewater, gases, and other biodegradable matter, and generating value-added products from such matter.

BACKGROUND OF THE INVENTION

The treatment and monitoring of water is a critical societal need. Approximately three percent (3%) of all electricity produced in the United States is consumed by wastewater treatment infrastructure. Of the electricity produced, approximately one and one-half percent (1.5%) is used in the actual treatment of wastewater. Anaerobic digestion (AD) can be used to treat more concentrated wastewater streams while generating biogas (comprised of methane, hydrogen and some carbon dioxide).

AD is a well understood process that reduces energy-intensive aeration needs and leads to a net reduction of bio-solids (sludge). Energy in biogas produced from anaerobic digestion can then be tapped using generators, fuel cells, or other devices. In recent years, biogas from anaerobic digestion and natural gas has emerged as an important partial solution to our energy needs. Burning methane removes a potential greenhouse gas and generates both heat and electricity for use on-site or sale back to the grid. If the gas is generated through anaerobic digestion, the electricity will be carbon neutral.

Unfortunately AD has certain disadvantages including: (1) relatively high retention times and large foot-print required; (2) high concentrations of $CO_2$ in biogas; (3) a requirement for pH control (addition of caustic); (4) the complex association of microbial partners required for an AD system to function optimally results in the system being sensitive to changes in temperature, pH and influent organics and; (5) elevated levels of hydrogen sulfide ($H_2S$) in the biogas. Current anaerobic digestion methods are typically ineffective for treating water to levels low enough for environmental release. The cumulative effect of these drawbacks, keep the cost of wastewater treatment high, which, thereby affects applications for a range of industries and municipalities.

One of the most important problems associated with AD is elevated levels of hydrogen sulfide ($H_2S$) in the biogas. Concentrations typically range between 0.1% and 2% depending on the feedstock. $H_2S$ is odorous, very corrosive to internal combustion engines, and considered an air pollutant, and thus must be removed (or scrubbed) from biogas prior to combustion. Therefore, there is a great need for low-cost $H_2S$ removal technologies that function effectively at small to mid-scale. A range of solutions currently exist to scrub natural gas of these acid compounds. For example, $H_2S$ can by reduced to very low levels by wet scrubbers using caustic and chlorine or sodium hypochlorite. However, the chemical storage, metering, and control equipment all add to the cost of a scrubber. The chemicals are hazardous, and the amounts required to treat $H_2S$ are quite high, so the cost of operating the scrubber can quickly add up.

Recent discoveries have shown that novel "electrogenic" organisms are capable of oxidizing and reducing a range of substrates including acids in gases and liquid streams, while maintaining electrical contact with electrodes. Often, the ability for electrogenic microbes to donate or accept electrons at electrodes enhances desired chemical reactions taking place, particularly, though not solely, with respect to reaction rates, reaction control, and operating ranges. The downside of such biological filtration methods is that is can be slower than chemical scrubbing and often requires upkeep including addition of nutrients and the influx of significant amounts of air into the system. Biological solutions would thus benefit from increased speeds of operations and operating ranges.

Thus, there is a critical need for cheaper and more energy efficient wastewater treatment technologies, as well as improved methods for scrubbing acidic compounds and/or $CO_2$ from biogas.

SUMMARY OF THE INVENTION

The present invention provides a simple and robust system to treat wastewater and/or biogases. In particular, the present invention provides novel systems and methods for increasing wastewater treatment rates and/or improving biogas quality (e.g., reduce the fraction of $CO_2$ in biogas) while decreasing operating costs for such treatment using the novel processes and bio-electrochemical system architectures described herein.

The bio-electrochemical systems of the invention utilize electrogenic microbes to enhance and improve the biological scrubbing of natural gas, or any gas. This enhancement/improvement comes in the form of increased performance and decreased cost of removing unwanted compounds from any gas or gas mixture, particularly but not limited to the removal of hydrogen sulfide from natural gas and biogas for the purpose of cleaner combustion.

More specifically, the present invention provides a bio-electrochemical system for treating wastewater. The bio-electrochemical system includes an anaerobic reaction chamber having two or more anode/cathode pairs disposed in therein. Each anode/cathode pair includes at least one anode and at least one cathode, each anode and cathode in the respective pairing being arranged in succession and in substantial proximity to each other, the two or more anode/cathode pairs also being are arranged in succession in substantial proximity with respect to one another. The bio-electrochemical system further includes at least one methanogenic microbe in proximity to at least one anode of the two or more anode/cathode pairs, and a power source configured to apply a voltage to the two or more anode/cathode pairs.

The anode and cathode in each of the anode/cathode pairs are preferably circular in shape, although any shape (e.g., oval, oblong, square, rectangular, pentagonal, hexagonal, etc.) can be used. In some embodiments, at least one of said anode/cathode pairs includes an air cathode. In other embodiments, the cathode in each of the anode/cathode pairs is an air cathode. In certain embodiments, the bio-electrochemical systems of the invention include an electron storage device disposed between the anode and the cathode of at least one of the two or more anode/cathode pairs. For example, two or more of the anode/cathode pairs can include an electron storage device disposed between the anode and the cathode of respective pairings.

The two or more anode/cathode pairs can be arranged in vertical succession. Alternatively, the two or more anode/cathode pairs are arranged in horizontal succession. The two or more anode/cathode pairs can be arranged in succession on a support rack. The support rack can include one or more conductive wires such that voltage is applied from the power source to the at least one anode and the at least one cathode in said two or more anode/cathode pairs through the support rack.

In certain embodiments, the anaerobic reaction chamber is configured to allow water or a gas to flow upwards through said chamber. For example, the anaerobic reaction chamber includes two or more anode/cathode pairs arranged in vertical succession in substantial proximity to each other, and water or a gas flows upwards through said reaction chamber and through said vertically oriented anode/cathode pairs. Additionally, the two or more anode/cathode pairs can be configured to enable water and/or gas to flow off-side of the anode/cathode pairs and up the chamber.

In some embodiments, at least one cathode in the two or more anode/cathode pairs has a surface area that is larger than a surface area of the anode in the anode/cathode pairing. In other embodiments, each cathode in the two or more anode/cathode pairs has a surface area that is larger than a surface area of the anode in each of the respective anode/cathode pairing. For example, at least one of the anode/cathode pairs can include two cathodes and one anode arranged in succession and in substantial proximity. In some embodiments, each of the two or more anode/cathode pairs includes two cathodes and one anode arranged in succession and in substantially proximity. In yet another embodiment, at least one of the anode/cathode pairs includes two anodes and one cathode arranged in succession and in substantial proximity. In still another embodiment, each of the two or more anode/cathode pairs includes two anodes and one cathode arranged in succession and in substantial proximity.

The two or more anode/cathode pairs can be electrically connected in series or in parallel to the power source. Alternatively, the two or more anode/cathode pairs can be independently wired to the power source. Depending on the electrical architecture used, the same voltage can be applied to the two or more anode/cathode pairs, or a plurality of different voltages can be applied to each of the two or more anode/cathode pairs. In certain embodiments, the bio-electrochemical systems of the invention can be electrically configured such that the cathode potentials in each of the two or more anode/cathode pairs is variable/different.

The anode and cathode of each anode/cathode pair can be made of the same material or different materials. Suitable materials include, but are not limited to, biochar, graphite granules, stainless steel, wire mesh, carbon mesh, carbon cloth, carbon fiber, carbon felt, or carbon granules, or a combination thereof. For example, the anode in at least one of the anode/cathode pairs can be made of a carbon material, such as carbon mesh, carbon cloth, carbon fiber, or carbon felt, while the cathode is stainless steel (e.g., a stainless steel mesh). Alternatively, the anode in at least one of the anode/ cathode pairs can be stainless steel (e.g., a stainless steel mesh), while the cathode is made of a carbon material such as carbon mesh, carbon cloth, carbon fiber, or carbon felt. In certain embodiments, the anode and/or the cathode are made from two or more materials. For example, the anode and/or cathode can be made from a combination of stainless steel and carbon mesh, carbon cloth, carbon fiber, or carbon felt, or a combination of wire mesh and carbon mesh, carbon cloth, carbon fiber, or carbon felt.

The anode and cathode in each of the anode/cathode pairs can be separated by a porous, insulating layer (e.g., a plastic material). The porous, insulating layer that separates the anode and cathode can also be used to support the anode and cathode in the pairing. For example, the anode and cathode can be painted onto either side of a porous, insulating layer.

The bio-electrochemical systems of the invention further include a filter. Suitable filter materials include, but are not limited to, biochar, graphite granules, or activated carbon.

In certain embodiments, the bio-electrochemical systems of the invention further include at least one sulfide-oxidizing microbe. Preferably, a plurality of sulfide-oxidizing microbes are included in the systems of the invention. The sulfide-oxidizing microbe is preferably a species of *Pseudomonas*, such as *Pseudomonas putida*. However any sulfide-oxidizing microbe is suitable for use in the bio-electrochemical systems of the invention.

The invention further provides a method for treating an acid gas (e.g., hydrogen sulfide) utilizing bio-electrochemical systems having the anode/cathode pairing schemes, electrical architecture and hydraulic architecture as substantially described above. In particular, the invention provides a method for treating an acid gas by providing an anaerobic reaction chamber comprising two or more anode/cathode pairs, each anode/cathode pair having at least one anode and at least one cathode arranged in succession and in substantial proximity to each other, the two or more anode/cathode pairs also being arranged in succession and in substantial proximity, and a power source configured to apply a voltage to the two or more anode/cathode pairs. The anaerobic reaction chamber further includes at least one sulfide-oxidizing microbe (e.g., a species of *Pseudomonas* such as *Pseudomonas putida*) in proximity to an anode in at least one of the two or more anode/cathode pairs. The anaerobic reaction chamber may even further include at least one methanogenic microbe. An acid gas (e.g., hydrogen sulfide) is flowed through the anaerobic reaction chamber, and a voltage is applied to the two or more anode/cathode pairs to facilitate electron transfer from the anode to the cathode, wherein said electron transfer initiates oxidation of said sour gas.

Preferably, the anaerobic reaction chamber is configured to allow water and/or a gas to flow upwards through said chamber, as previously described. In certain embodiments, the anode and the cathode in each of the two or more anode/cathode pairs are arranged such that water and/or gas flows upwards through an anode, then a cathode in each of the anode/cathode pairs. The anode/cathode pairing schemes and configurations, electrical architecture and/or hydraulic architecture are otherwise as described above.

These and other objects, along with advantages and features of the invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same or similar parts throughout the different views.

Also, the drawings are not necessarily to scale, emphasis instead generally being placed upon illustrating the principles of the invention.

DETAILED DESCRIPTION

Figure 1:
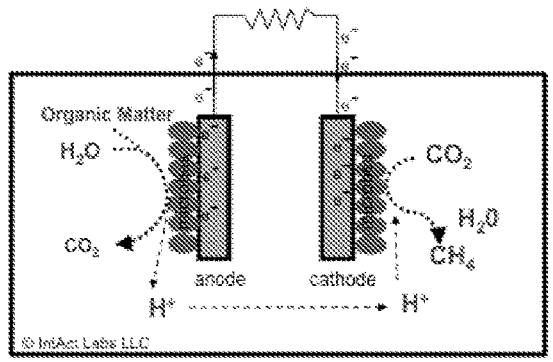
FIG. 1 is a schematic of a bio-electrochemical system with a biological anode and a biological air cathode.

The present invention provides novel architecture and components for an electrogenic system for enhancing water treatment rates, improving biogas quality, and treating natural gas or biogas. The architectures of the bio-electrochemical systems described herein enhance anaerobic digestion (by methods that include among other improvements, one or more of the following: increasing COD removal rates, improving biogas quality, lowering operating temperatures, facilitating primary fermentation of complex organics) and can be utilized for both wastewater treatment and treatment of biogases produced by such treatment methods (e.g., $H_2S$).

The bio-electrochemical systems of the invention utilize an anode/cathode pairing scheme, together with a distinct hydraulic architecture, and a proposed electrical architecture, in a fully enclosed electrogenic chamber. Electrogenic microbial biofilms on the anodes and cathodes remove pollutants in wastewater or gases. Modifications of the basic architecture and voltage scheme can be used to treat various substrates in water including, but not limited to, dissolved carbon, nitrogen, phosphorous, perchlorate, chlorinated solvents, sulfur, copper, uranium, and other pollutants. Alternative modifications to the ancillary systems and architecture can be used to clean natural gas and biogas—particularly removing sulfur species such as hydrogen sulfide and other gas species that turn the gas acidic or sour (referred to herein as "sour gas").

The architectures described herein provides for high surface area in anodic and cathodic compartments over which gases or gas/liquid mixtures rich in $H_2S$ or other acids flow or move. The anode and cathode can be arranged in any configuration to enhance the acidic gas removal, including separate compartments, same compartments, or one compartment separated by an insulating layer which is permeable to gases and/or liquid. The compartments can be operated in batch mode, or continuous flow (plug-flow/flow-through or continuous stir flow) mode or any combination thereof. This architecture can further be coupled to anaerobic digestion processes, both as a pre-treatment or post-treatment from anaerobic digesters or other natural gas generating processes. As such, wastewater treatment and gas (natural gas or biogas) treatment can be accomplished utilizing two separate bio-electrochemical systems utilizing the novel architecture described herein. Alternatively, the novel architecture described herein allows for wastewater treatment and gas (natural gas or biogas) treatment to be integrated into one bio-electrochemical system.

Based on the capability of many bacteria and bacterial consortiums to interact electrically with electrodes, the proposed architecture turns the anodic compartment of a microbial fuel cell into an oxidation chamber for $H_2S$ gas. The anodic electrodes will provide the oxidation potential normally provided by electron acceptors such as oxygen, without needing to provide these acceptors externally. As described in more detail below, this process has the potential to overcome a number of important problems associated with existing biological $H_2S$ removal technologies. By supplying the oxidation potential via electrodes rather than oxygen, the system architecture described herein will favor the oxidation of $H_2S$ to elemental sulfur rather than $H_2SO_4$ which can damage packing media in traditional bio-filtration. Further, as an anaerobic process a slower build-up of bacteria which have been shown to clog bio-filters is expected. Finally, in the embodiment in which a voltage is applied to the cell, more control of the size and potential of the oxidation region is provided and therefore treatment rates can be expected to increase while footprints decrease versus typical bio-filters.

Existing Gas Scrubbing/Treatment Solutions and Limitations

Physio-Chemical Processes

While a number of chemical and biological processes have been invented to scrub natural gas and biogas of hydrogen sulfide ($H_2S$), few are cost-effective. Physio-chemical processes can be divided into two categories: those that convert $H_2S$ into elemental sulfur and low solubility metallic sulfides, and those that adsorb $H_2S$ onto solid adsorbents. The former includes technologies designed to remove between 100 and 20,000 kg of $H_2S$ a day, such as Dow's SulFerox® process and US Filter's LO-CAT® process of oxidative absorption of H₂S by iron (Fe) chelated solutions, a scale far above requirements for farm-based anaerobic digestion.

So-called "iron sponge" technologies utilize chemically-activated adsorption of H₂S to solid media. Many such systems utilize iron-oxide-impregnated wood-chips to selectively adsorb H₂S and mercaptans. These processes are typically run in batch-mode with separate regeneration or with a small flow of air for continuous partial regeneration. They have been run at up to 85% of the theoretical maximum efficiency. Because iron sponges are more appropriate at smaller scales, some have been employed at farms. For example, Huntington Farm in Cooperstown, N.Y. employed a 140 kg $Fe_2O_3/m^3$ sponge which resulted in removal of 1.84 kg $H_2S$/kg $Fe_2O_3$. A number of companies are now marketing proprietary iron oxide media for iron sponges, such as SulfaTreat®, Sulfur-Rite®, and Media-G2® technologies.

However, iron sponge techniques have significant drawbacks. The adsorption process are limited, requiring regeneration of the entire sponge via oxygen exposure and wetting after only 20 to 80 days. Sulfur build-up prohibits more than one or two regeneration cycles before new media is needed. Disposal of media is problematic and labor intensive, resulting in high operating costs and environmental concerns. The end result is that at smaller scales, existing chemical methods for H₂S removal are often too costly and impractical.

For these reasons there has been increasing interest in biological removal of H₂S via bio-filters, bio-scrubbers, and bio-trickling filters.

sulfuric acid in the leachate and reduces the pH. For H₂S gas scrubbing in particular, these species typically carry out the following reactions:

$$H_2S + 2O_2 \rightarrow H_2SO_4 \qquad \text{i)}$$

$$2H_2S + O_2 \rightarrow 2S° + 2H_2O \qquad \text{ii)}$$

$$5H_2S + 8KNO_3 \rightarrow 4K_2SO_4 + H_2SO_4 + 4N_2 + 4H_2O \qquad \text{iii)}$$

Both phototrophs and chemotrophs have been employed. A number of organisms in the genus *Thiobacillus*, including *Thiobacillusthiooxidans*, are capable of oxidizing H₂S at very low pH (<3) and can continue to survive at pH as low as 1. This is beneficial as sulfuric acid resulting from oxidation reactions can reduce pH and prevent the growth of other species. *Pseudmonas* species have also been shown to be effective in biological removal of H₂S. *Pseudomonas putida* has been shown to be effective as long as ammonia levels are below about 60 ppm and a recent study demonstrated that *Pseudomonas stutzeri* was responsible for sulfide oxidation in a biological filter.

Three basic approaches have been developed for the biological treatment of H₂S gas: Bio-filters, bio-scrubbers, and bio-trickling filters. Bio-filters utilize biofilms growing on solid support media such as compost or simple foam cubes that often doubles as a nutrient source. Bio-scrubbers utilize a two-stage solution in which H₂S is first absorbed into a liquid and then oxidation by bacteria growing in a liquid phase. Bio-trickling filters utilize bacteria immobilized on a rigid support media such as rock or activated carbon, over which water and nutrients are trickled. Each of these approaches has benefits and costs reviewed briefly in Table 1 below.

TABLE 1

Advantages and disadvantages for various biological removal technologies.

| | Advantage | Disadvantage | Summary |
|---|---|---|---|
| Biofilters | Low operating cost; broad substrate specificity; easy operation. | Low efficiency results in large footprint; poor control of operating conditions | Better for high volumes of low concentrations sulfurous odorants |
| Bioscrubbers | Better operating control; capability with higher inlet gas concentration (up to 300 ppm); can handle sever fluctuations of concentration; higher removal efficiency | liquid phase must be aerated and re-circulated, increasing operating costs; nutrients must be carefully monitored; biomass growth results in solid waste disposal. | Appropriate for high concentration and fluctuating H₂S streams, but more costly |
| Bio-trickling filter | Simple design; Low operating costs; low retention time; can treat high concentrations | Clogging of filter due to biomass growth; Not complete H₂S removal without O₂ addition; filter replacement needed | Simple and cheap but still needs improvement |

Biological H₂S Removal

Biological treatment solutions are more environmentally benign than chemical methods and can require less energy to operate. However, they are still in an early stage of development and depending on the process, require large footprints, frequent media replacement, or result in incomplete H₂S removal. Therefore, there is a great need for technologies that can increase the efficacy and economics of biological removal of hydrogen sulfide from biogas. Cheaper and more efficient alternatives would in particular benefit small to mid-sized farms desiring to utilize anaerobic digestion technology enabling more rapid diffusion of an important wastewater treatment and alternative energy solution.

Biological filtration typically employs certain species of bacteria capable of oxidizing hydrogen sulfide to different reaction products, most often sulfates and H+ which form Compared to bio-scrubbers and traditional bio-filters, bio-trickling filters have a number of advantages. They are easy to set-up and maintain, cheap to operate, and can handle very high concentrations of H₂S. Unfortunately, field-studies have found a number of challenges to their widespread adoption. Most importantly, depending on the media, the biofilm growth can clog openings resulting in a high pressure-drop through the system.

Bio-Electrochemical Systems

Generally, bio-electrochemical systems have been shown to generate electricity or chemical products by exploiting the ability of certain microbes (typically termed "electrogens", "exoelectrogens" or "electricigens" in the literature) to transfer electrons to electrodes or accept electrons from electrodes while consuming organic matter. Similar to a chemical fuel cell, an oxidation reaction in the anodic chamber releases energy, electrons and ions. These migrate to the cathodic region where they are reduced to form a substance with lower free energy of formation (usually water, in the case of an air-cathode) (See FIG. 1). It should be noted that the terms bio-electrochemical systems (BESs) and microbial fuel cells (MFCs) are sometimes used interchangeably herein.

BESs typically consist of electrodes, such as anode and cathodes, both or individually coated in biofilms with the ability to transfer or accept electrons from electrodes. Electrodes may also be coated in noble metals to catalyze one of the reactions taking place. The electrodes can be separated by an electrolyte which conveys ions between them (ion selective membrane can be included, but membrane-less systems also work). Electrodes, biofilms, electrolytes, and catalysts may or may not be enclosed in a casing. Each of these elements, which include the casing, can be connected to external circuits, control systems, or other reactors for use in combined systems. The geometrical configuration of the elements in a microbial fuel cell and their material definition can together be defined as the "architecture" of the system.

Most early application-oriented BES studies, including those described in co-owned and co-pending PCT/US10/25224 (published as WO 2010/147683), focused on the ability to remove biological oxygen demand (BOD) from wastewater. However, there has been an increasing appreciation for the ubiquity of micro-organisms that interact with electrodes, and the flexibility of oxidation and reduction reactions that can take place at electrodes. Anodic microbes have proven capable of oxidizing animal manure slurry, human wastewater, food processing waste agricultural waste such as cellulosic biomass, as well as a range of gases such as hydrogen.

Applying Voltages to Bio-Electrochemical Systems for Electromethanogenesis

Anaerobic digestion uses microbial species that occupy different niches, roughly divided into two groups based on their metabolisms. The acid-former group, which contains many sub-niches, includes species that digest polysaccharides, sugars, fatty acids, alcohols and more complex molecules in the waste into organic acids, primarily acetate, but also others like lactate and butyrate. The second class is the methane-formers, or methanogens, which consist of two sub-niches. Some methanogens metabolize acetate directly and produce methane as a byproduct (aceticlastic methanogenesis), while other methanogenic species combine $H_2$ as an electron donor with $CO_2$ to produce methane (hydrogenotrophic methanogenesis). In aceticlastic methanogenesis, for each molecule of acetate consumed, equal amounts of carbon dioxide and methane are produced. In hydrogenotrophic methanogenesis, for every four molecules of hydrogen gas consumed, one molecule of carbon dioxide is also consumed to produce methane and two molecules of water (see e.g., Table 2). Thus, while aceticlastic methanogenesis produces carbon dioxide, the hydrogenotrophic process effects a net decrease in carbon dioxide.

TABLE 2

| Routes of oxidation | |
|---|---|
| Reaction | Equation |
| Hydrogenotrophic methanogenesis | $4H_2 + CO_2 \rightarrow CH_4 + 2H_2O$ |
| Aceticlastic methanogenesis | $CH_3COO^- + H^+ \rightarrow CH_4 + CO_2$ |

TABLE 2-continued

| Routes of oxidation | |
|---|---|
| Reaction | Equation |
| Propionate oxidation | $CH_3CH_2COO^- + 2H_2O \rightarrow CH_3COO^- + 3H_2 + CO_2$ |
| Acetate oxidation | $CH_3COO^- + 4H_2O \rightarrow 2HCO_3^- + 4H_2 + H^+$ |

Importantly, numerous other reactions during the metabolism of polysaccharides, sugars and other compounds release carbon dioxide so that it is never the limiting reactant, but $H_2$ is only a minor byproduct of the metabolism of some species. Under normal conditions, hydrogenotrophic methanogenesis contributes roughly one-third of the methane produced through the metabolism of acetate and other suitable compounds. Increasing the availability of hydrogen in AD would thus favor hydrogenotrophs over acetoclasts and reduce relative amounts of $CO_2$ as a byproduct in the biogas. Alternatively, enabling microbes to reduce $CO_2$ and hydrogen ions to methane by providing them with electrons can similarly favor methane formation.

Bio-electrochemical systems have been run in two primary ways: as fuel cells releasing energy, and as bio-electrochemical systems in which applied voltages encourage specific reactions at electrodes. By applying voltages to BESs, researchers developed microbial electrolysis cells (MECs) which generate hydrogen at cathodes. Because the anodic biofilm provides additional voltage to the system, $H_2$ gas can be produced at chemical cathodes using only a fraction of the power of conventional electrolysis. This is combined with the consumption of biomass or other organic material. The process consists of the electrolysis of organic matter, rather than water, by bacteria, liberating protons and electrons that can then form $H_2$ with a small energy input, usually employing a chemical catalyst. MEC systems use chemical hydrogen formation at cathodes and this hydrogen could be used as the basis for increasing methane production in an anaerobic digester. More recently, the reduction of $CO_2$ to methane at cathodes without the intermediary product of hydrogen was demonstrated. By applying a potential below −0.7V, methanogens were able to accept electrons from electrodes and reduce $CO_2$ to methane in a process termed electromethanogenesis. Results were verified by growth of a pure culture of Methanobacteriumpalustre in a pure $CO_2$ atmosphere.

Electrochemical and Bio-Electrochemical Sulfur Removal

The ability for bio-electrochemical systems to manage aqueous sulfide and sulfur has been of interest to researchers for some time. In the early 1990s Dr. Byung-Hong Kim and colleagues patented a process for bio-electrochemical desulfurization of petroleum. In their invention cathodicmicroorganisms such as Desulfovibrio vulgaris reduced sulfur to $H_2S$ in an aqueous petroleum stream. Because direct electron transfer mechanisms were not yet postulate, Kim et al used electron mediators such as Methyl viologen to facilitate the transfer of electrons between electrodes and bacterial cells. This work was continued by researchers who examined sulfate reduction to sulfide which was catalytically re-oxidized at an anode.

With the resurgence in interest in BESs following the discovery of direct electron transfer mechanisms, a new set of researchers examined the oxidation of sulfur compounds in anodic compartments. It was demonstrated that both square and tubular MFCs could convert up to 98% of the sulfide in the effluent of a lab-scale up-flow anaerobic digester to sulfur with current outputs up to 101 mW/L. Follow-up studies with control reactors researchers found that sulfides could be spontaneously oxidized in a fuel cell device in abiotic graphite anodes (rather than biological anodes). This work was followed recently with a reactor which abiotically removed sulfides present in an anaerobic digestor effluent from a pulp and paper mill, using applied voltages to poise anode potentials at +2 V vs SHE. The authors find reduced sulfides present 44±7 mg L-1 to 8±7 mg L-1 with the 75±4% of the sulfide recovered as alkaline sulfide/polysulfide solution from which solid elemental sulfur was obtained. A drawback to this process seems to be that sulfide reduction decreased as biofilms formed on the electrode and the authors therefore employed a switching mechanisms to change anodes to cathodes periodically.

The state-of-the art in BES and $H_2S$ biofilters therefore presents a gap. It is known that a range of complex microbial communities are capable of oxidizing $H_2S$ in gas, and it is known that cathodic electrically active microbes are capable of reducing sulfur compounds. Biofilters, and bio-trickling filters in particular, may provide a low-cost environmentally beneficial method for $H_2S$ removal. However, there are still important operating problems to overcome. Most importantly, most $H_2S$ oxidizing bacteria or bacterial communities utilize oxygen as the electron acceptor, thereby creating three problems: (1) build-up of sulfuric acid which can damage the packing media; (2) rapid bacterial growth resulting in solid waste and clogging; and (3) the need for oxygen supply to the system resulting in increased operating costs.

Yet, it has been shown in a diverse range of studies that anodic electrodes in BES systems can effectively provide the oxidizing power needed for most oxidation reactions, and that further the tremendous flexibility of electrogenic microbial communities suggests that there will almost definitely be microbes or combinations of microbes capable of utilizing $H_2S$ as an electron source while utilizing electrodes as electron acceptors.

This system has the potential to overcome a range of problems associated with existing biological $H_2S$ treatment systems.

Novel Bio-Electrochemical System Architecture for Improved Environmental Remediation-Wastewater Treatment and Gas Treatment The present invention provides novel architecture and components for electromethanogenic bio-electrochemical systems that can be utilized not only to treat wastewater (through electromethanogenesis) but to also treat acidic or "sour" biogas byproducts thereof.

Over the years, a number of different BES architectures and components have been developed and tested for different uses. Two major categories of architectures are those that operate in batch mode versus flow-through (plug flow or continuous stir) mode. In a batch-mode system, an oxidant is placed in a reactor in batches and is treated until some endpoint is reached before the next batch is treated. In flow-through mode, a continuous flow of material to be treated is provided into a reactor with a concurrent flow out of the reactor for a constant volume to be retained inside. Flow through reactors include, side-ways flow or upward flow, such as the upflow microbial fuel cell (UMFC), as well as the continuous stir tank reactor (CSTR). In a UMFC, nutrient rich influent stream is percolated upwards through a porous anode material (e.g., graphite granules) with the goal of generating electricity without applying voltages. The original concept of a UMFC was an aerobic system in which an anode was placed in the middle of a tubular chamber and wastewater flowed over the top of the system and onto the sides where a cathode was placed in the open air. A number of different electrode designs have also been used in MFCs. Original MFC designs used in laboratory tests were not scalable due to the use of flat electrode surfaces, which provided low surface areas per volume of reactor. Therefore, high surface area materials were developed, called a "brush anode", consisting of small-diameter graphite fibers linked to a central core (generally a non-corrosive metal such as titanium) that provides both high conductivity as well as resistance to fouling. Brush anodes have been made of carbon fibers (e.g. PANEX®33 160K) and cut to a set length and wound using an industrial brush manufacturing system into a twisted core consisting of two titanium wires. When placed in a reactor, the total surface area of typical brush electrodes per volume of reactor has been estimated to be as high as 9600 $m^2/m^3$. Reactors using these brushes have produced up to 2400 $mW/m^2$ in a cube reactor with a defined acetate medium.

Co-owned and co-pending application PCT/US10/25224, published as WO 2010/147683 (the contents of which are herein incorporated by reference in its entirety), describes an anaerobic digestion system for the treatment of wastewater and solids. More particularly, this application describes BESs utilizing anaerobic digestion for methane production from organic material. The electro-methanogenic chambers utilize the principals of bio-electrochemical systems to enhance the conversion of organic material such as wastewater to methane/biogas. As described in PCT/US10/25224 (WO2010/147683), electromethanogenesis favors hydrogenotrophic over acetoclastic methanogenesis, and concomitantly consumes $CO_2$ and improves purity of the methane gas produced, without the need to keep the cathode free of biofilm. While the electro-methanogenic BESs described in PCT/US10/25224 (WO2010/147683) enables a very simple, low-cost system that can treat BOD and generate methane, it does not address the treatment of biogases (e.g. sour gas) produced by such treatment methods. It also does not describe in detail the range of architectures that could be used to implement such a process.

The present invention provides a distinct set of architectures for electromethanogenesis and a design for a bio-electrochemical system in which the anode of a typical BES is converted into an oxidation chamber for $H_2S$ gas while transferring the electrons to an electrode held at the correct potential, rather than to oxygen. Two processes could be employed in this regard:

1. By connecting this anodic electrode to a cathode that can complete the reduction half-reaction, a current could be induced to flow and energy captured to do work, as in a microbial fuel cell (MFC).
2. By applying a voltage across a BES anode and cathode, an increase reaction rate for $H_2S$ oxidation could be encouraged.

In both cases, the reaction would be analogous to the reaction [2 $H_2S+O_2 \rightarrow 2\ S°+2\ H_2O$], but would proceed in 2 half reactions in separate chambers of the device. The anode reaction would likely be:

$$H_2S \rightarrow S°+2H^++2e^-$$ 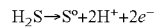

The liberated electrons would flow through external circuitry to the cathode chamber, while the free protons would likely be consumed by other bacteria, or cross an ion-selective membrane or air-barrier (depending on the set-up) to the cathode chamber to equalize the charge balance. Elemental sulfur metal would precipitate out of solution and could be collected for use. In the cathode chamber, $O_2$ or another oxidant (such as nitrate) would complete the cathodic half-reaction in the following or an analogous reaction:

$$\tfrac{1}{2}O_2 + 2H^+ + 2e^- \rightarrow H_2O \qquad \text{ii)}$$

The cathodic reduction reaction could be catalyzed by a chemical catalyst (e.g. platinum) or could be biologically catalyzed. Additionally, the reaction [5 H$_2$S+8 KNO$_3 \rightarrow$4 K$_2$SO$_4$+H$_2$SO$_4$+4 N$_2$+4 H$_2$O] holds intriguing possibilities for combined remediation of hydrogen sulfide and nitrate. This could be achieved by counter flowing biogas contaminated by hydrogen sulfide through an aqueous waste stream high in nitrate. This could be achieved in a single reactor chamber with substrate for bacterial attachment, and would produce from these two waste products two chemicals that are industrially important, as well as elemental nitrogen and water. This reaction could also be approximated in a two-chambered bio-electrochemical reactor similar. However, a new reduction reaction would occur in the cathode chamber using nitrate as the oxidant:

$$2NO_3^- + 12H^+ + 10e^- \rightarrow N_2 + 6H_2O \qquad \text{iii)}$$

Electrode and Hydraulic Architecture

Figure 2A:
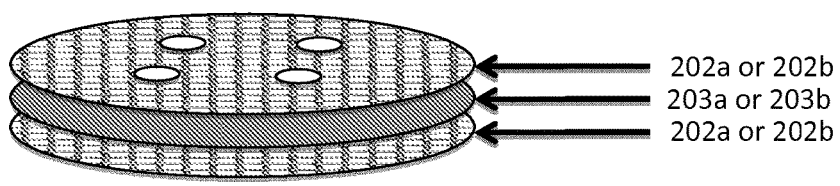
FIG. 2A is a schematic depicting an anode/cathode pair separated by empty space (separated with or without an insulating spacer) or an insulating layer for use in a bio-electrochemical system of the invention.

The basic concept is to create a high-surface area anodic and cathodic compartment over which gases or gas/liquid mixtures rich in H$_2$S or other acids flow or move. The anode 202a and cathode 202b are provided in pairs and can be arranged in any configuration to enhance the acidic gas removal, including separate compartments, same compartments, or one compartment separated by empty space 203a or an insulting layer 203b which is permeable to gases (see FIG. 2A). The one or more compartments can be operated in a batch mode or plug-flow/continuous flow-through mode or any combination thereof. Preferably, the one or more compartments are operated in a plug-flow/continuous flow-through mode to avoid potential pH problems associated with batch mode which can adversely affect the cathode.

In certain embodiments, a small air cathode (e.g., biological air cathode or chemical cathode) is paired with one or more anodes to augment anaerobic digestion. The voltage generated can be used to power the voltages applied to the anode/cathode pairs.

Figure 2B:
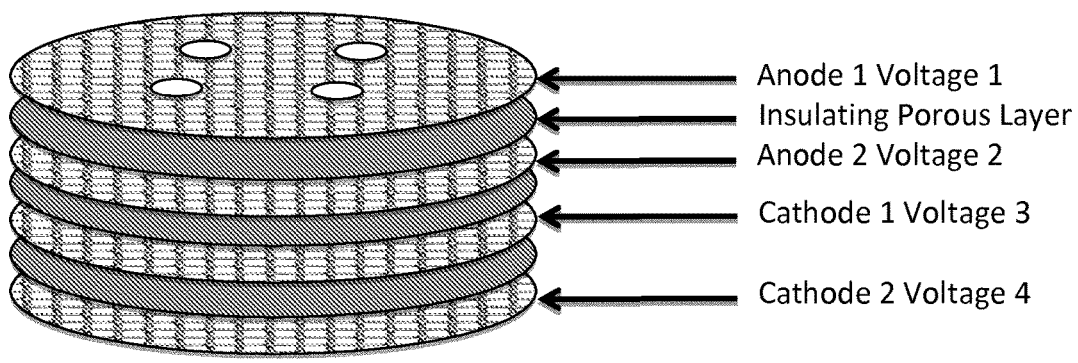
FIG. 2B is a schematic depicting an anode/cathode arrangement including two anodes and two cathodes for use in a bio-electrochemical system of the invention
Figure 2C:
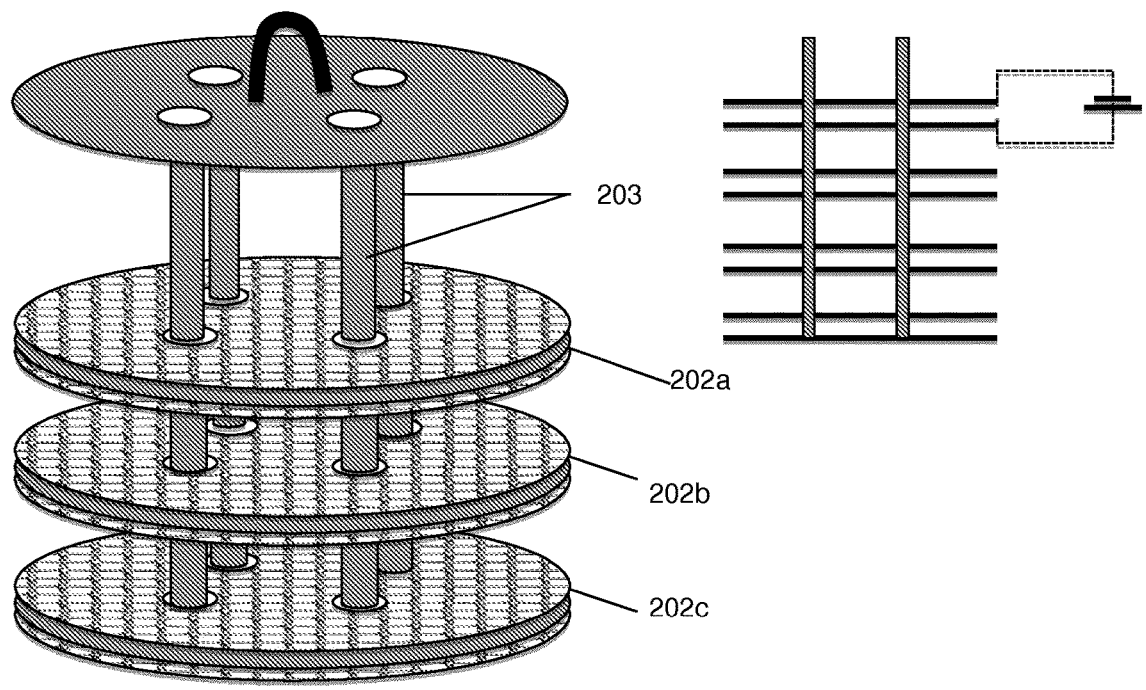
FIG. 2C is a schematic depicting three sets of anode/cathode pairs arranged on a rack support for use in a bio-electrochemical system of the invention.

A proposed electrode scheme includes a set of three anode/cathode pairs 202a, 202b, and 202c oriented perpendicular to the flow of wastewater or gas, supported by a structural components 203 parallel to the flow of water or gas (see e.g., FIG. 2C). Alternative embodiments include anode cathode pairs that are parallel to the flow of water or gas with structure components that are perpendicular to the flow of water or gas. Each anode cathode pair can have one or more anode and cathode. For example, 2 anodes followed by 2 cathodes can be considered an anode/cathode pair (see e.g., FIG. 2B); three anodes followed by three cathodes can be considered an anode/cathode pair, etc.

Figure 3:
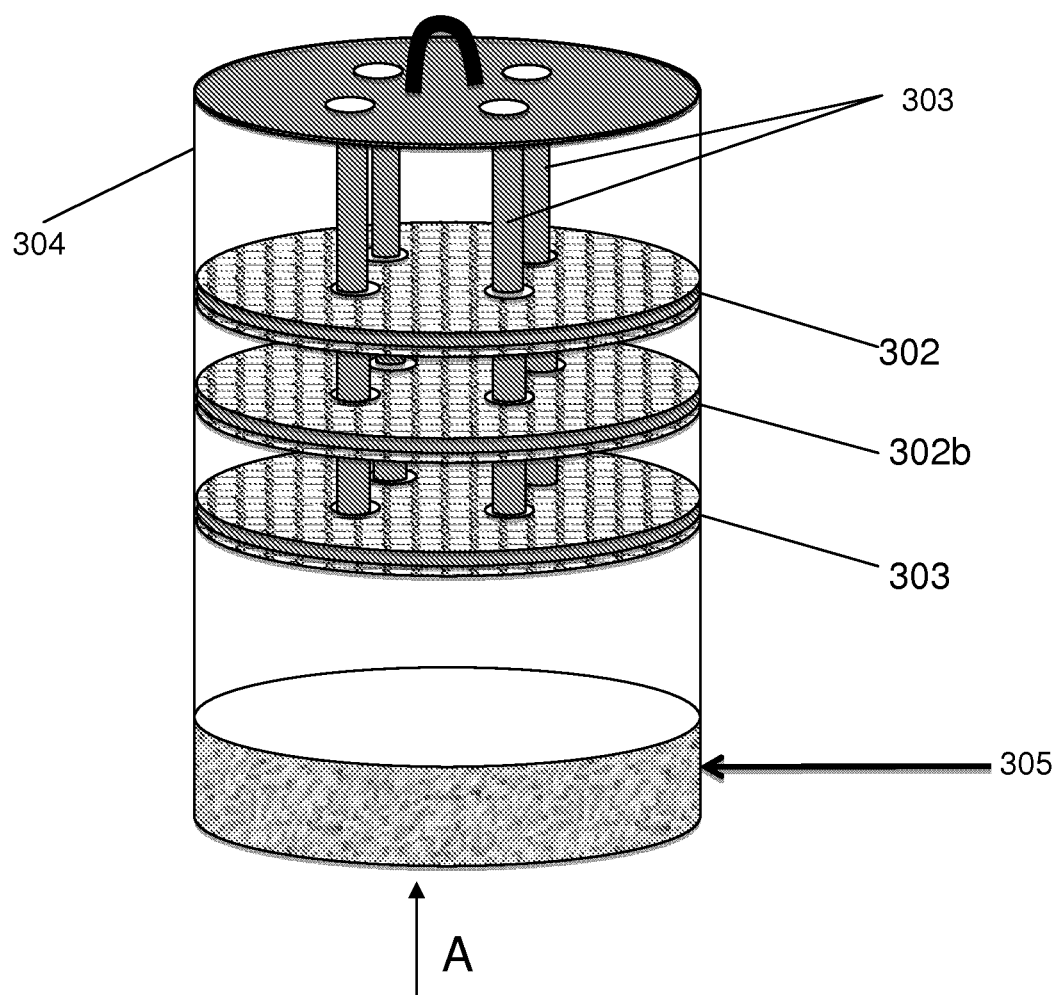
FIG. 3 is a schematic depicting a bio-electrochemical system of the invention having an up-flow architecture that includes three sets of anode/cathode pairs (each pair separated by empty space or an insulating layer), arranged on a support rack, and a biofilter, enclosed in an anaerobic chamber.

This paired electrode scheme will preferably be used with an up-flow hydraulic architecture, as shown in FIG. 3. As shown in FIG. 3, anode/cathode pairs 302a, 302b, and 302c, will be created on a rack 303 and placed in an enclosed, anaerobic chamber 304. The bottom of the chamber 304 preferably contains a conductive biofilter 305 (e.g., biochar, activated carbon, graphite granules, or other material etc.). Water or gas will flow up the chamber in the direction of arrow A, pass through the conductive biofilter 305, then through anode/cathode pairs 302a, 302b, and 302c. In the preferred embodiment the water or gas will first flow past an anode and then flow past a cathode to optimize the current density.

The same rack shown in FIG. 3 can be used in a plug-flow (horizontal flow) architecture, or in a circulating batch reactor. In the case of a circulating batch reactor, the system is no longer flow-through but is a batch reactor filled with anode/cathode pairs. The size and shape of each anode cathode pair can vary. For example, the cathode:anode surface area ratios can be 1:1, 1:2, 2:1, 1:3, 3:1, 1:4, 4:1, 1:5, 5:1. In a particular embodiment, the cathode is substantially bigger than the anode. One way to achieve a larger cathode than anode is to have one anode segment followed by two or more cathode segments, along the length of the water or gas flow, such that the water or gas flows from anode to cathode. Alternatively, two or more anode segments can be followed by a cathode segment in order to achieve a larger anode than cathode. The entire rack can be used to retrofit existing anaerobic digesters, or in novel chamber designs.

In particular embodiment, the anode and cathodes are designed with pore sizes that enable liquid streams to pass through them. These pore sizes can vary based on location in the chamber, to maximize surface area while problems that include but are not limited to solids and gas trapping. In one embodiment, the pore sizes will be big enough so that the anode and/or cathodes are mesh-like structures with pore sizes ranging from sub-millimeter to several centimeters. In another embodiment the pore size will increase along the flow of water to decrease the chance of gas trapping. In another embodiment the pore size will increase along the chamber to filter solids.

The electrodes must be close together to reduce internal resistance, but far enough apart to avoid large pH gradients and ensure electrical insulation. The distance between the electrodes can vary from 0.0001 cm up to 10 m, 0.001 cm to 1 m, 0.01 cm to 1 cm, or any specific value in between said ranges. In one embodiment, the distance between the electrodes is about 1 cm or less, and the distance is empty space separated with or without an insulating spacer. Alternatively, the distance between the electrodes is created by an insulating layer. For example, the electrodes can be painted on either side of the insulating layer using conductive paint such as graphite paint. A space between the two sides is not painted, leaving an insulating space between electrodes.

The electrode pairs must also be close together to reduce internal resistance, but far enough apart to avoid large pH gradients and ensure electrical insulation. For example, the distance between the anode/cathode pairs can vary from 0.0001 cm up to 10 m, 0.001 cm to 1 m, 0.01 cm to 1 cm, or any specific value in between said ranges.

Figure 4:
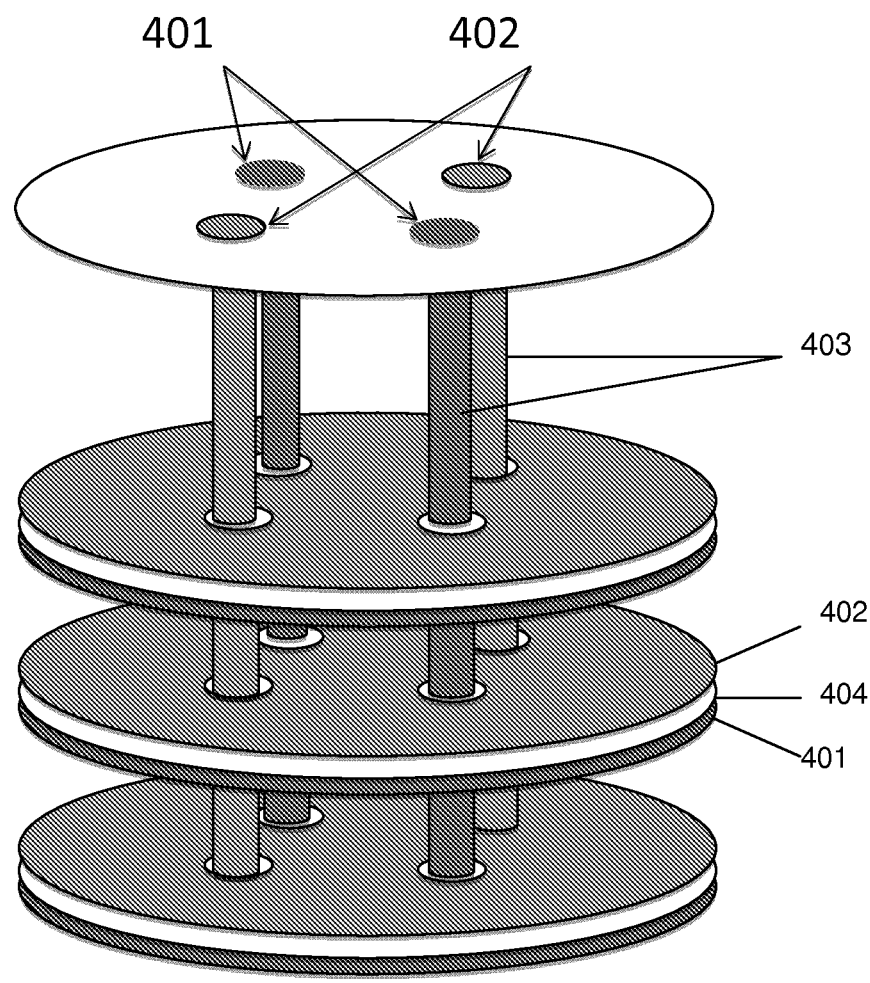
FIG. 4 is a schematic depicting different voltages applied across the support structures and thereby applied across all relevant anode/cathode pairs of a bio-electrochemical system according to the invention.

The supporting structures between each anode/cathode pairs can be made of any insulating material such as plastic. Alternatively, the supporting structures can be conductive and each structure communicated electrically to one or the other sets of polarized electrodes (e.g. some or all of the cathodes or some or all of the anodes). In this case, an applied voltage from a power source to each support structure will apply voltages to electrodes down the length of the chamber. For example, the supporting structures can be conductive and in electrical communication with the anode 401 or cathode 402 while being electrically insulated 404 from opposite polarized electrode. A voltage applied across the support structures will then be applied across all relevant anode/cathode pairs (see FIG. 4). This can be done with two or more support structures 403. The support structure can be stiff. But it can also be a wire, set of wires, nylon rope, steel rope, or other non-stiff material, so that the anode/cathode pairs hang off of it.

The electrode scheme is designed to be used primarily with applied voltages (from a power source) to each anode and cathode pair, and/or the poising of one or another of the electrodes in an electrode pair. The applied voltage can range of very small (~0.01 volts) to very large (greater than 1.5V). Each anode/cathode pair can be set at the same potential difference. Alternatively, the anode can be left at a potential set by the electrogenic biofilm (typically in the region −0.05 to −0.25 versus standard hydrogen electrode (SHE), and the cathode potential varied depending on the location in the reactor and the rate of the reaction. For example, the cathode potential might be started very low at the input of the reactor (less than −1.1V versus SHE) and each subsequent cathode potential raised slightly down the length of the flow. The goal in this case is the removal of different substrates or classes of substrates at each cathode. For example, a cathode potential in range of −0.5V to −1.1V will favor the reduction of $CO_2$ to $CH_4$. A cathode potential in the range of −0.1V to −0.3V will favor the reduction of nitrates ($NO_3^{2-}$) to nitrogen gas. Cathodic potentials can be set for the removal of numerous additional contaminants including chlorinated solvents and radioactive materials. This treatment system could also involve different chambers with cathode potentials set for the removal of specific contaminants. These chambers can be placed in sequence, series or in parallel. Alternatively, the potential of each electrode can be poised at the exact internal resistance between the electrodes, thus minimizing power requirements.

The potential difference between electrodes can be maintained using any external power source, including a microbial fuel cell, photovoltaic, or any other power source. The system can be controlled by a computer control system featuring logic that controls electrode performance. These controls can vary the potentials at each electrode as a function of performance. The electrodes can be electrically connected in a parallel, series, or independent fashion to each other. In being wired independently, each electrode can be observed and maintained individually, allowing poor performing electrodes to be disconnected. These potentials can be fixed or varied in response to internal conditions. Alternatively, electrode stack and/or system architecture itself can be varied based on internal and external conditions. For example, the spacing between electrodes can be varied along the reactor and at different points in time, in response to influent quality (Total suspended solids, pH, temperature, salinity, etc.) or other measurable such as temperature, pressure, internal resistance, current density, or any other factor pertinent to system operation.

Figure 5:
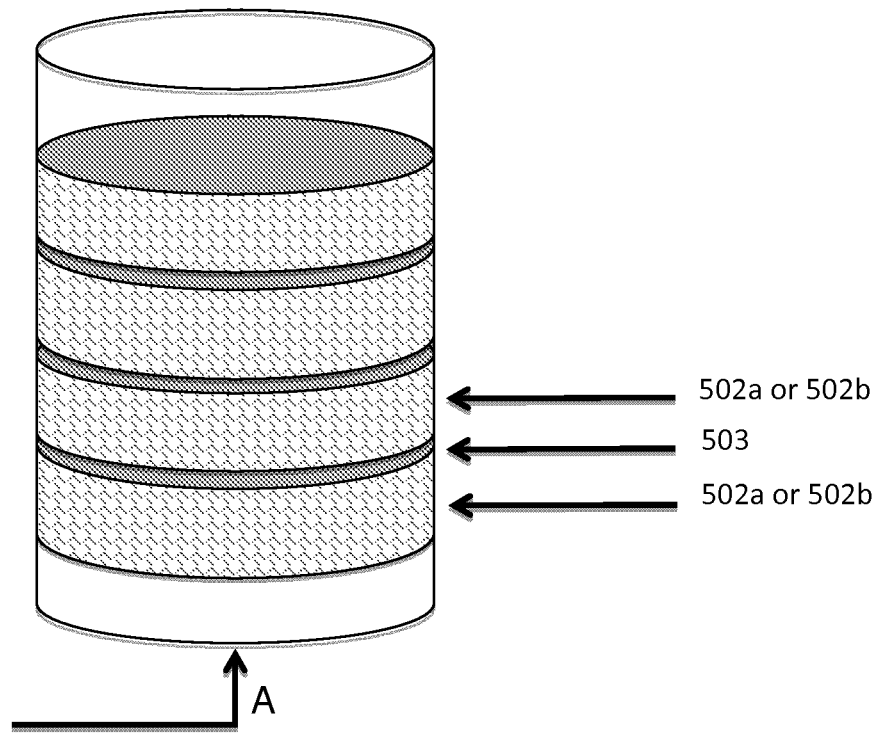
FIG. 5 is a schematic depicting a bio-electrochemical system of the invention having an up-flow architecture, as shown in FIG. 3, where the three sets of anode/cathode pairs each include a granular anode and a granular cathode.

The anode and cathode electrode material can be the same or different, and the anode and cathode itself can be made of one or multiple kinds of electrode materials. For example, the anode and cathode can be made of wire mesh, or carbon cloth, or stainless steel. Alternatively, the anode can be carbon of some kind (cloth, felt, granules, mesh, etc) and the cathode can be stainless steel. Alternatively, the cathode or anode can be compromised of two or more kinds of electrode materials (e.g. steel mesh pressed around carbon cloth). Alternatively, anode and cathode electrodes can have a stainless steel mesh coated with an activated carbon/binder mixture, removing the possibility of anodic corrosion and improving cathodic catalytic reaction. Suitable electrode materials also include biochar, coal and activated carbon, or other granular media such as graphite granules. An example of an architecture similar to that shown in FIG. 3, but instead using granular cathodes 502a and granular anodes 502b separated by an insulating porous layer 503 is shown in FIG. 5. Water or gas flows in the direction of arrow A through the granular anodes and cathodes. The use of granular cathodes/anodes is particularly well-suited for gas removal. This design can be used in cassettes or filter cartridges housing each electrode. The granular media can also be placed at the bottom of the up-flow system, where it filters solids (e.g., reference 305 in FIG. 3).

Figure 6:
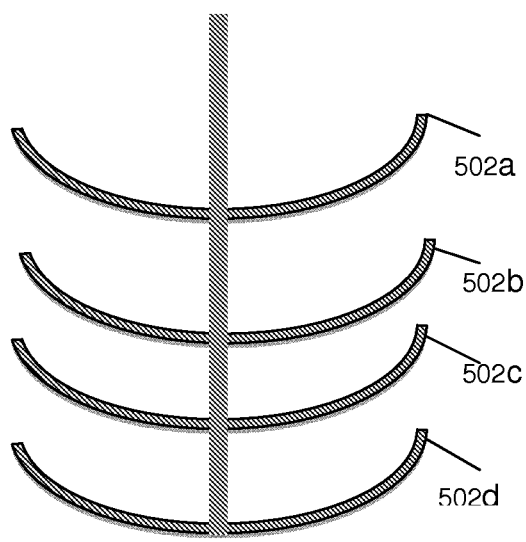
FIG. 6 is a schematic depicting curved or angled electrode pairs useful to avoid gas-trapping in a bio-electrochemical system of the invention
Figure 7:
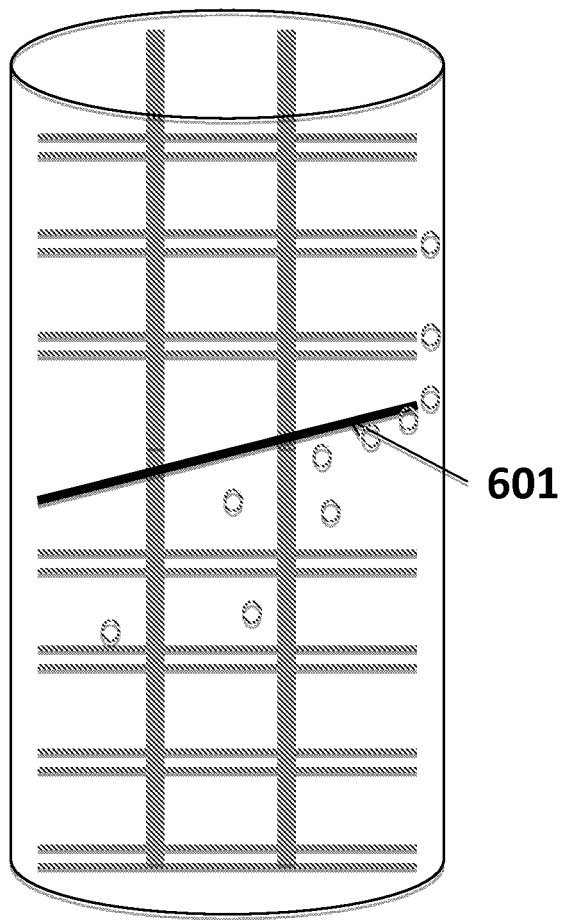
FIG. 7 is a schematic depicting a bio-electrochemical system of the invention containing an angled solid divider, useful for diverting gas or impurities to either side of the anaerobic chamber

Electrodes can be of any size and shape. Preferred embodiments have curved or angled electrode pairs (502a, 502b, 502c, 502d) (e.g., to avoid gas trapping), as shown in FIG. 6. In one embodiment the electrodes curve upwards at the ends closest to the outside wall, and have a separation between them and the outside wall for gas to bubble. In another embodiment the electrodes are angled downwards, towards the outside wall or towards the center of the chamber. As shown in FIG. 7, the system can also have an angled solid dividing layer 601 at regular intervals along the flow of water or gas, designed to siphon gas or impurities to either side of the chamber.

In certain embodiments, an electron storage device is disposed between the anode and the cathode of one or more anode/cathode pairs, thereby decoupling anodic oxidation from cathodic reduction. Such a configuration can be used to manage pH and gas constituents in the anaerobic reaction chamber. For example, if pH levels rise to high, cathode activity can be stopped by stopping flow to the cathode, while the activity at the anode maintained and the electrons are stored in the electron storage device. Conversely, if pH levels fall, anode activity can be stopped by stopping flow to the anode, and electrons can be pumped from the electron storage device to the cathode.

In a particular embodiment, the anode of a typical BES system is converted into an $H_2S$ bio-trickling filter, as described in Examples 1-2 below. The filter media will therefore be conductive, and in the first instance we propose to use graphite granules. Voltages can be applied to each electrode to poise them at $H_2S$ oxidizing voltages. Alternatively, the microbial population can be optimized to maintain required potentials.

The BES architecture described herein can further be coupled to anaerobic digestion processes, both as a pre-treatment or post-treatment from anaerobic digesters or other natural gas generating processes, as described in Example 3 below. For example, different voltages can be applied to different anode/cathode pairs within the one or more chambers containing different electrogenic microbes, such that one or more anode/cathode pairs are tuned for anaerobic digestion process, whereas other anode/cathode pairs are tuned for gas scrubbing.

Electrogenic Microbes

Any suitable electrogenic microbe can be used in the bio-electrochemical systems described herein. In certain embodiments, the anode(s) of the systems are enriched with a sulfide-oxidizing bacteria. For example, a number of bacteria in the *Psuedemonas* genus have been shown to function in bio-electrochemical systems and others have been show to oxidize $H_2S$. In a particular embodiment, the sulfide oxidizing bacteria is *Psuedemonasputida*. Other examples of sulfide oxidizing bacteria include, but are not limited to species of *Achromatium, Beggiatoa, Chromatium, Campylobacter* or *Campylobacter*-like species, *Halothibacillaceae, Macromonas, Sulfolobus, Thiobacillus, Thiomicrospira, Thiothrix, Thiospira, Thioploca,* and *Thiospirillopsis*. Other species of sulfide oxidizing bacteria can be identified using mixed cultures. For example, a directed evolution approach can be used identify microbes that complete sulfide oxidizing reactions by slowly varying the redox conditions under which they are growing (e.g. by decreasing or increasing electrode potential), or through a genetic engineering approach to allow sulfide oxidizing bacteria to complete these reactions. This strategy might include expression of heterologous cytochrome proteins, pilin structures, secreted redox mediator molecules or other outer membrane proteins.

The bio-electrochemical systems described herein may further include a methanogenic microbe, such that the system can be utilized for both anaerobic digestion processes and treatment of sour gas produced by such processes. Examples of suitable methanogenic microbes include, but are not limited to, species of *Methanobacterium, Methanosarcina, Methanococcus,* and *Methanospirillum.*

The invention having now been described by way of written description, those of skill in the art will recognize that the invention can be practiced in a variety of embodiments and that the foregoing description and examples below are for purposes of illustration and not limitation of the claims that follow.

EXAMPLES

The following examples, including the experiments conducted and results achieved are provided for illustrative purposes only and are not to be construed as limiting upon the present invention.

Example 1: Bio-Trickling Filter Based Bio-Electrochemical System

The bio-trickling filter BES system converts a basic biotrickling filter into a bio-electrochemical system. In traditional bio-trickling filters, a sour gas, or any gas that needs to be cleaned, is passed upwards through a solid matrix such as volcanic rock, on which bacteria can grow. Liquid is re-circulated to provide nutrients and to remove liquid reaction products. Usually, in the case of $H_2S$ removal, this likely is very acidic, and results in water that must be reacted with a base such as lime.

Figure 8:
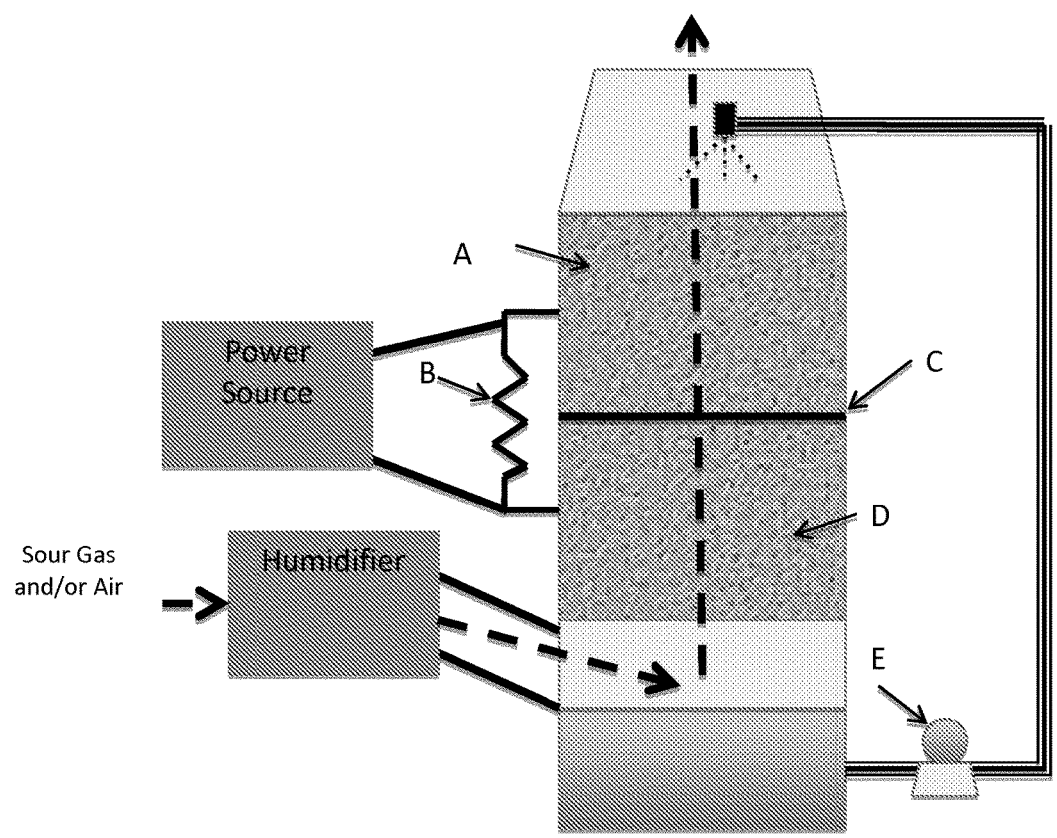
FIG. 8 is a schematic depicting a bio-trickling filter based bio-electrochemical system according to the invention.

In the system shown in FIG. 8 (A=Anodic $H_2S$ Oxidation; B=Electrical connection between anode and cathode; C=Porous Electrically Insulating Layer; D=Cathode: $CO_2$ Reduction; E=Recirculation Pump), the solid substrate for growth is replaced by an electrically conductive substrate such as graphite granules or stainless steel wires (A) and (D). In the first design, we separate two chambers with a space or porous electrically insulating layer (C), and treat one chamber as an anode and another chamber as a cathode. One embodiment of this design is to treat chamber (D) as a cathode and chamber (A) as an anode. $H_2S$ or other undesirable gases are oxidized in the anode, resulting in liquid phase bi-products such as sulfuric acid. These acidic products are then trickled down to the cathode (D) where they can be reduced. Applied voltages can be using to modulate the performance of the system.

Example 2: Alternative Bio-Trickling Filter Based Bio-Electrochemical System

Figure 9:
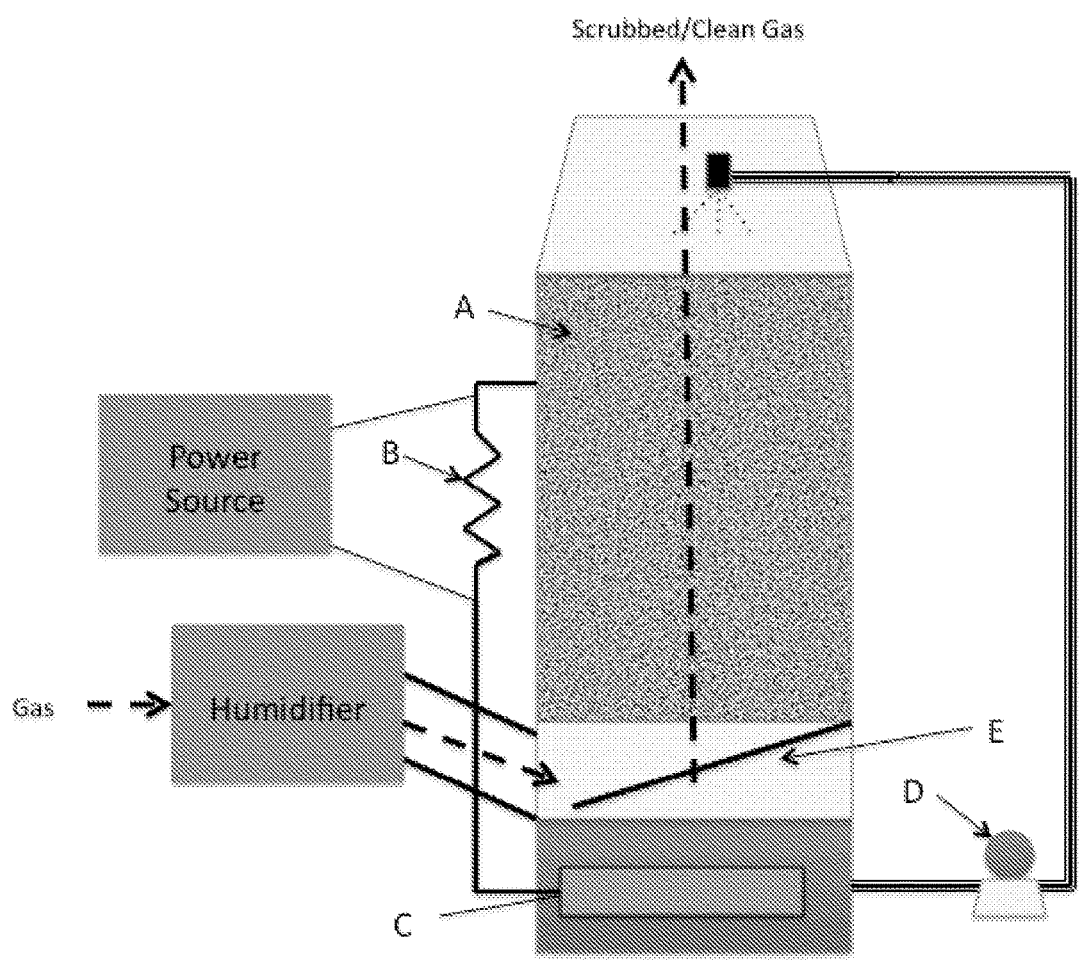
FIG. 9 is a schematic depicting an alternative design for a bio-trickling filter based bio-electrochemical system according to the invention.

An alternative to the design presented above is shown in FIG. 9 (A=Anodic Compartment (gas/liquid phase); B=Electrical connection between anode and cathode; C=Cathodic Compartment (liquid phase); D=Recirculation Pump; E=Baffle for collection of cathodic gas generation), which utilizes the entire trickling filter as an anode compartment (A). In this case, the media can be a conductive solid matrix such as graphite granules or stainless steel wires, or any other conductive substrate. $H_2S$ and other gas species are oxidized at the anode and liquid flowing over the substrate trickles the reaction products into the cathode chamber (C). Depending on the reaction products, cathodic reduction in the liquid phase will likely evolve gas, such as hydrogen, which can be collected via a baffle (E) and used as a value-added product or combined with the cleaned biogas to generate a higher value stream. The baffle is optional and the system may or may not be employed using applied voltages and poised potentials.

Figure 10:
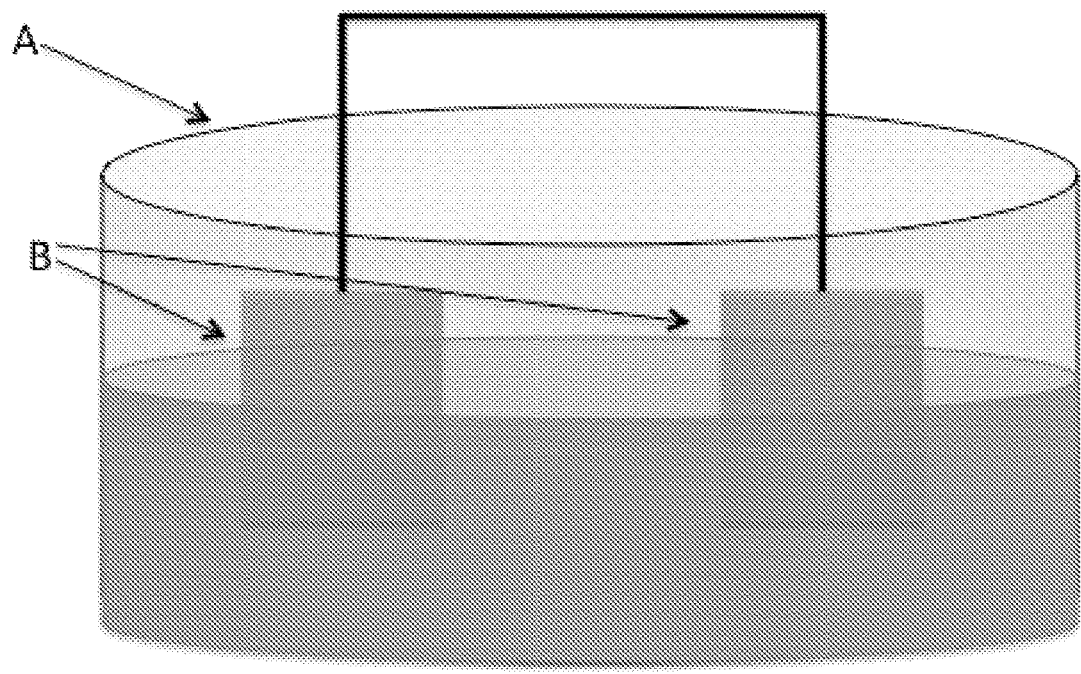
FIG. 10 is a schematic depicting a combined anaerobic digestion and $H_2S$ filter based bio-electrochemical system according to the invention.

Example 3: Combined Anaerobic Digestion and $H_2S$ Filter Based on Bio-Electrochemical System In the BES system architecture shown in FIG. 10 (A=Anaerobic Digester; B=Electrodes, in which gas phase is anode and liquid phase is cathode), the $H_2S$ scrubbing technology described above is coupled with an anaerobic digester. An anode oxidizes hydrogen sulfide in the gases while a cathode reduces $CO_2$ and other elements within the liquid portion of the stream or influent. A voltage can be applied between anode and cathode to optimize rates of oxidation and reduction by the plurality of methanogenic and electrogenic microbes on the electrodes. The result is biogas or natural gas which is sweeter (e.g. lower in hydrogen sulfide) and more abundant in methane versus $CO_2$ than otherwise would be. The electrodes can be any shape or material including, but not limited to flat graphite or stainless steel discs, or graphite granules or any matrix media that is conductive. The electrodes provide support for bacteria growing in the gas phase and liquid phase.

Figure 11:
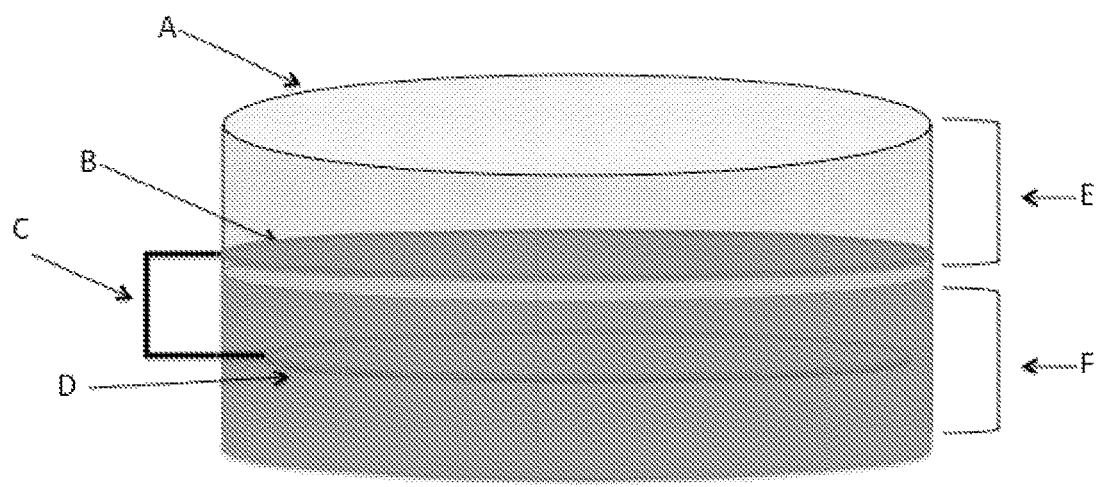
FIG. 11 is a schematic depicting an alternative design for a combined anaerobic digestion and $H_2S$ filter based bio-electrochemical system according to the invention

An alternative design is depicted in FIG. 11, where A=Anaerobic digester or Methanogenic chamber; B=Anode (can be a floating anode); C=Electrical connection between anode and cathode; D=Cathode (submerged in liquid portion); E=Gas portion of the methanogenic chamber; and F=Liquid/solids portion of the methanogenic chamber Example 4: Mobile Bioelectric Filtration System (MBFS)

Figure 12:
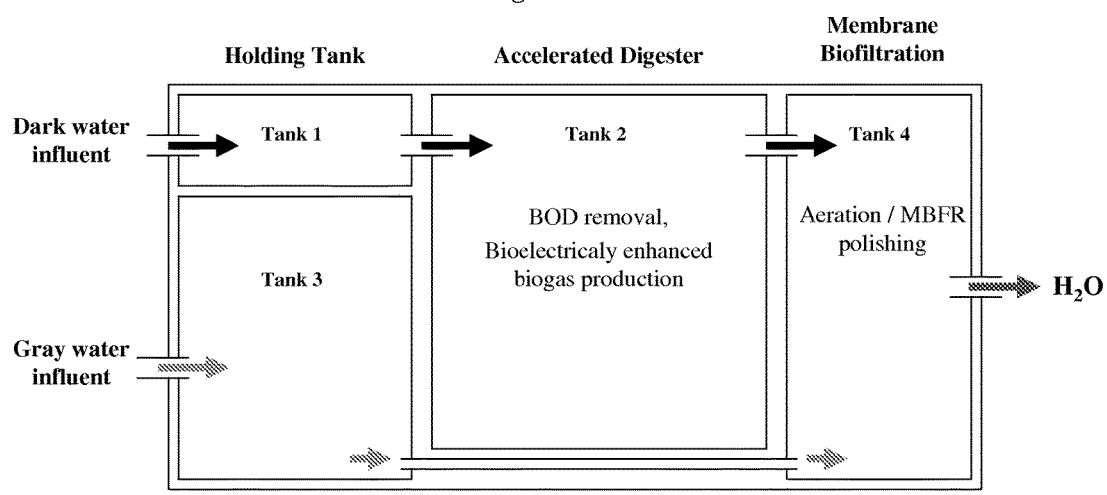
FIG. 12 is a schematic depicting a mobile bio-electric filtration system (MBFS) according to the invention.

The goal of the present example was to develop a multiunit mobile wastewater treatment process that we call a "Mobile Bioelectric Filtration System" (MBFS). This system will include 4 separate chambers, each optimized to allow for a reduced system footprint (FIG. 12). Leveraging bio-electrochemical processes in a unique application—the enhancement of biogas production—the MBFS is designed to meet the following specifications: (1) treat of grey and dark waste water (separately or in combination); (2) capable of treating upwards of 250 gallons a day (3) be at least energy neutral, if not energy positive.

Figure 13:
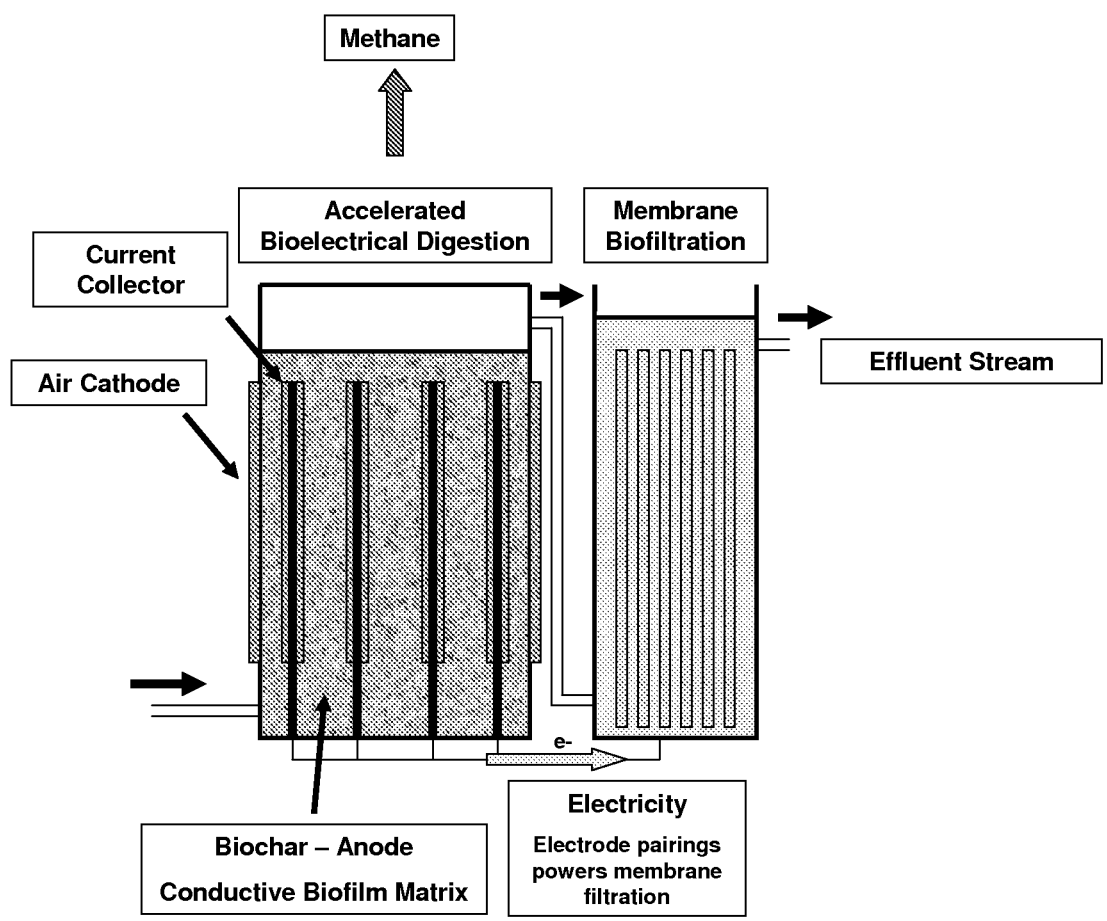
FIG. 13 is a schematic depicting an accelerated anaerobic digester chamber for use in a mobile bio-electric filtration system (MBFS) according to the invention.

The core of the MBFS is Chamber 2, an anaerobic digester augmented by bio-electrodes. Traditional research on bio-electrochemical system has sought to maximize electricity production while minimizing methane formation. However, based on principals described in more detail below, our accelerated digester will flip this paradigm—using bio-electrochemical processes to radically accelerate methane formation. This has the benefit of leveraging a very well understood and robust biological process, and augmenting it with new processes. Depending on system operation, a small amount of electricity can be generated, or a poised potential applied to further augment treatment rates. The net result is a more compact anaerobic digester, relatively pure biogas for use as heat or in generators or portable methane fuel cells. The predicted performance objectives and characteristics of the Accelerated Anaerobic Digester are as follows:

Reactor dimensions: 4.8×2.4×2.6 m (equivalent of 12,000 gallons)
Retention time: 1 day
TCOD removal~90%
Bioelectrical Maximal Voltage~400 mV (1 kΩ)
Bioelectrical energy~30 Wh/day-m$^3$
Biogas production~250 m$^3$/day Benefits of Accelerated Digestion In short, an accelerated digester, augmented by bio-electrochemical processes, has the following potential benefits versus traditional systems:

1. Higher methane formation rates at smaller scale than competing high rate digesters
2. Increased treatment rates versus existing high-rate anaerobic digesters.
3. Some electricity production, depending on operating mode.
4. Modulation of pH via cathode reactions MBFS System Architecture:

The four-chamber system will include two pre-treatment chambers, an accelerated digester chamber (FIG. 13), and an aerated chamber with membrane bio-film reactor for polishing. The two pre-treatment chambers will condition temperature and pH of the graywater and darkwater separately. The darkwater will be fed into the accelerated anaerobic digester (AAD) which will remove the majority of the COD and TSS. The output of AAD and the graywater will be sent into the polishing chamber, where aeration and membrane bio-filtration will occur. Table 3 below summarizes potential sizing and performance of each chamber for COD.

Systems Analysis and Preliminary Design

Our combined system includes four chambers: pre-treatment, accelerated anaerobic digestion, aeration/membrane filtration, and pathogen removal. The goal of the system analysis will be to calculate the following: (1) estimated chamber size; (2) COD loading per chamber; (3) gas production rate; (4) chamber performance requirements. Table 3 listed above provides a sample calculating using COD only (no TSS). It assumes an input COD of 2000 mg/l for darkwater and 100 mg/l for graywater. Experimental results and further background research can finalize these calculations and sizes, combining TSS, COD, and other pollutants.

These analyses can be used to estimate pumping requirements, power requirements, power production, and other parameters needed for preliminary design. Using this, the preliminary design of a combined system will be created, including: (1) total power output; (2) power requirement; (3) chamber sizes; (4) quantification of biogas production; and (5) preliminary selection of energy production systems (fuel cell, generator, solar panel).

What is claimed is:

1. A bio-electrochemical apparatus for treating wastewater, comprising:
   a fully enclosed anaerobic reaction chamber comprising two or more anode/cathode pairs disposed therein and arranged in substantial proximity, each anode/cathode pair comprising at least one anode and at least one cathode where at least one anode is in proximity to a methanogenic microbe; and
   at least one power source configured to apply a voltage to the anode/cathode pair;
   wherein said two or more anode/cathode pairs are arranged in vertical succession; and

TABLE 3

Sample calculation for chamber sizes, COD loading rates, and required COD removal performance targets. This assumes 10,000 gallon per day loading. Total system volume is 12,444 gallons (47.1 m$^3$); this assumes that the MBFR is 20% of system volume, the two pre-treatment chambers are a combined 15%, and the AAD comprising the remaining 65%. TSS and COD can be calculated in this way.

| Chamber Number | Chamber Title | Chamber Size (M3) | COD in (mg/l) | COD Out (mg/l) | WW Volume (M3/Day) | Total COD Loading (KG/Day) | Required Performance (KG/M3Day) |
|---|---|---|---|---|---|---|---|
| 1 | Pre AAD | 2.4 | 2000 | 1950 | 5.7 | 0.28 | 0.121 |
| 2 | AAD | 37.7 | 1950 | 100 | 5.7 | 10.50 | 0.279 |
| 3 | Pre MBFR | 4.7 | 100 | 100 | 32.2 | 0.00 | 0.000 |
| 4 | MBFR | 9.4 | 100 | 25 | 37.9 | 2.84 | 0.301 |
|  | Total System | 47.1 | 800 | 25 | 37.9 | 0.28 | 0.006 |

Electrode Design:

The AAD (FIG. 13) will use a biological anode (e.g., biochar), for both electricity production and facilitation of the AD process. Such an electrode must be light and large in surface area. The proprietary system described herein will use biochar granules, forming a conductive matrix to both increase available microbial surface area and promote the development of an exoelectrogenic conductive biofilm matrix. Biochar is an innovative electrode concept for bio-electrochemical systems, combining light weight with high conductivity and microbial affinity. A current collector will be fabricated out of carbon cloth and PVC tubing. An air cathode will be sized and paired with anodes. As described above, electrodes can either be poised to augment reaction rates, or left un-poised to harness a small amount of electricity.

wherein said anaerobic reaction chamber is configured to allow the wastewater or a gas to flow upwards to the anode, and the cathode, in each of the anode/cathode pairs; and
wherein a surface area ratio of each cathode: anode in a pair is 1:5 to 5:1 and the distance between the anode/cathode pairs is approximately 0.01 cm to 1 cm.

2. The bio-electrochemical system of claim 1, wherein the at least one power source is configured to apply the same voltage to said two or more anode/cathode pairs.

3. The bio-electrochemical system of claim 1, wherein said anode/cathode pair is configured to enable gas to flow up the chamber and past the two or more anode/cathode pairs.

4. The bio-electrochemical apparatus of claim 1, wherein said two or more anode/cathode pairs are arranged in vertical succession on a support rack.

5. The bio-electrochemical apparatus of claim 1, wherein said anode and said cathode are comprised of a material selected from the group consisting of: biochar, graphite granules, stainless steel, wire mesh, carbon mesh, carbon cloth, carbon fiber, carbon felt, carbon granules, conductive paint, and a coating comprised of carbon in binder.

6. The bio-electrochemical apparatus of claim 2, wherein said anode is comprised of carbon mesh, carbon cloth, carbon fiber, or carbon felt, and said cathode is comprised of stainless steel.

7. The bio-electrochemical apparatus of claim 5, wherein said anode or said cathode is comprised of two or more materials.

8. The bio-electrochemical apparatus of claim 7, wherein said anode or cathode is comprised of a combination of stainless steel and carbon mesh, carbon cloth, carbon fiber, carbon felt, or carbon in a binder, or a combination of wire mesh and carbon mesh, carbon cloth, carbon fiber, carbon felt, conductive paint, or a coating comprised of carbon in a binder.

9. The bio-electrochemical apparatus of claim 1, wherein said anode and cathode are separated by a porous, insulating layer.

10. The bio-electrochemical apparatus of claim 9, wherein said porous, insulating layer comprises a plastic material.

11. The bio-electrochemical apparatus of claim 9, wherein said porous, insulating layer is a support structure on which said cathode is disposed.

12. The bio-electrochemical apparatus of claim 11, wherein the anode and cathode are a conductive paint applied to either side of said porous, insulating layer.

13. The bio-electrochemical apparatus of claim 4, wherein said support rack comprises one or more conductive substances electrically connected to each of said anode/cathode pairs and the at least one power source.

14. The bio-electrochemical apparatus of claim 13, wherein said voltage is applied to the at least one anode and the at least one cathode in said two or more anode/cathode pairs through said support rack.

15. The bio-electrochemical apparatus of claim 1, wherein the anodes and cathodes comprise a stainless steel mesh coated with an activated carbon/binder mixture.

16. The bio-electrochemical apparatus of claim 1, wherein the anode/cathode pairs are curved.

17. The bio-electrochemical apparatus of claim 1, further comprising an angled solid dividing layer.

* * * * *